US012760470B2

(12) United States Patent
Pereira Damásio et al.

(10) Patent No.: US 12,760,470 B2
(45) Date of Patent: Oct. 13, 2026

(54) PAPER AND PROCESS FOR MANUFACTURING PAPER USING MICROFIBRILLATED CELLULOSE IN THE CELLULOSE PULP

(71) Applicant: Klabin S.A., São Paulo-SP (BR)

(72) Inventors: Renato Augusto Pereira Damásio, Telêmaco Borba-PR (BR); Marcelo Coelho Dos Santos Muguet Soares, Telêmaco Borba-PR (BR)

(73) Assignee: Klabin S.A., São Paulo (BR)

( * ) Notice: Subject to any disclaimer, the term of this patent is extended or adjusted under 35 U.S.C. 154(b) by 0 days.

(21) Appl. No.: 17/058,071

(22) PCT Filed: May 17, 2019

(86) PCT No.: PCT/BR2019/050183
§ 371 (c)(1),
(2) Date: Nov. 23, 2020

(87) PCT Pub. No.: WO2019/227187
PCT Pub. Date: Dec. 5, 2019

(65) Prior Publication Data
US 2021/0207325 A1 Jul. 8, 2021

(30) Foreign Application Priority Data
May 28, 2018 (BR) ......................... 102018010864-6

(51) Int. Cl.
*D21H 11/18* (2006.01)
*B82Y 30/00* (2011.01)
(Continued)

(52) U.S. Cl.
CPC ............... *D21H 11/18* (2013.01); *D21H 1/00* (2013.01); *D21H 11/04* (2013.01); *D21H 21/18* (2013.01);
(Continued)

(58) Field of Classification Search
CPC ...... D21H 11/18; D21H 111/14; D21H 15/02; D21H 27/10; D21H 27/30; D21H 27/40; B82Y 30/00
See application file for complete search history.

(56) References Cited

U.S. PATENT DOCUMENTS

| | | | | |
|---|---|---|---|---|
| 2013/0180680 A1* | 7/2013 | Axrup | D21H 17/24 162/158 |
| 2017/0072670 A1* | 3/2017 | Tajvidi | D21H 17/25 |

(Continued)

FOREIGN PATENT DOCUMENTS

| | | |
|---|---|---|
| CN | 108560316 | 9/2018 |
| WO | WO-2012/039668 | 3/2012 |

(Continued)

OTHER PUBLICATIONS

Mikael Ankerfors Microfibrillated cellulose: Energy-efficient preparation techniques and key prop 2012 TRITA-CHE—Report 202:38 ISSN 1654-1081 ISBN 978-91-7501-464-7 (Year: 2012).*

(Continued)

*Primary Examiner* — Dennis R Cordray

(57) ABSTRACT

The present invention relates to a papermaking process of kraft paper, sackraft or paperboard comprising adding 1.0 to 1.5% by weight of MFC with a preferred average diameter between 1 and 568 nanometers and starch ranging from 1.0 to 10.0 kg/ton, preferably 5.0 kg/ton, generating a pulp with higher concentration of microfibers and improved strength, and consequently, a final paper with grammage ranging from 60 to 440 $g/m^2$ and with improved strength properties for use in packaging materials.

10 Claims, 39 Drawing Sheets

Case A - Medium without application of microfibrillated cellulose (MFC) in pulp

Case B - Medium with application of microfibrillated cellulose (MFC) in pulp

(51) Int. Cl.

| | |
|---|---|
| ***B82Y 40/00*** | (2011.01) |
| ***D21H 11/04*** | (2006.01) |
| ***D21H 21/18*** | (2006.01) |
| ***D21H 21/52*** | (2006.01) |
| ***D21H 27/00*** | (2006.01) |

(52) U.S. Cl.
CPC .............. *D21H 21/52* (2013.01); *B82Y 30/00* (2013.01); *B82Y 40/00* (2013.01)

(56) References Cited

U.S. PATENT DOCUMENTS

| | | | | |
|---|---|---|---|---|
| 2017/0328003 | A1* | 11/2017 | Retsina .................... | D21C 3/20 |
| 2019/0003126 | A1* | 1/2019 | Lepo ...................... | D21H 17/23 |

FOREIGN PATENT DOCUMENTS

| | | |
|---|---|---|
| WO | WO-2012/098296 | 7/2012 |
| WO | WO-2017/044676 | 3/2017 |
| WO | WO-2017/192476 | 11/2017 |

OTHER PUBLICATIONS

International Preliminary Report on Patentability of PCT/BR2019/050181 dated May 13, 2020, English translation, 9 pages.

International Search Report of PCT/BR2019/050183 dated Aug. 22, 2019, English translation, 4 pages.

Korhonen, O., Sawada, D. & Budtova, T. All-cellulose composites via short-fiber dispersion approach using NaOH-water solvent. Cellulose 26, 4881-4893 (2019). https://doi.org/10.1007/s10570-019-02422-z [Abstract Only].

Odabas, Nora & Henniges, Ute & Potthast, Antje & Rosenau, Thomas. (2016). Cellulosic Fines: Properties and Effects. Progress in Materials Science. 83. 10.1016/j.pmatsci.2016.07.006. [Abstract Only] 1 page.

Proposed New TAPPI Standard: Standard Terms and Their Decision for Cellulose Nanomaterial WI 3021. Technical Associate of the Pulp & Paper Industry Inc. 6 pages.

Franklin Zambrano et al, "Using Micro- and Nanofibrillated Cellulose as a Means to Reduce Weight of Paper Products: A Review", BioResources 15(2), Published Mar. 4, 2020, pp. 4553-4590.

* cited by examiner (A)

(B)

(A)

(B)

(A)

(B)

(A)

(B)

(A)

(B)

(A)

(B)

PAPER AND PROCESS FOR MANUFACTURING PAPER USING MICROFIBRILLATED CELLULOSE IN THE CELLULOSE PULP

CROSS-REFERENCE TO RELATED APPLICATIONS

This application is a U.S. National Stage Application under 35 U.S.C. § 371 of International Application No. PCT/BR2019/050183, filed May 17, 2019, which claims priority to BR 102018010864-6, filed May 28, 2018, the contents of which are incorporated to the present disclosure by reference.

TECHNICAL FIELD

The present invention relates to a papermaking process comprising the addition of microfibrillated cellulose (MFC) to the cellulosic pulp, generating a paper of special grammage and improved mechanical strength properties. The present invention relates to the field of papermaking.

BACKGROUND OF THE INVENTION

Concerns about the environment gains prominence every day in the countries' agenda, which create laws to regulate the generation of waste and their destination. All this work derives from the awareness that it is necessary to use raw materials from renewable sources in industrial production processes.

The pulp and paper production chain is characterized by a high degree of investment and has significant presence in scale economy, since it is present from forest exploitation to commercialization.

The location of factories is linked to the concentration of forest assets, and there is a strong dependence between the production of raw material and the industrial process.

Thus, a papermaking process that decreases the dependence and extraction of raw material and confers greater mechanical strength to paper, produced with the use of microfibrillated cellulose (MFC) integrated to the papermaking process instead of using large amounts of additives, reduces losses, making the process less expensive and less harmful to the environment.

WO 2011/068457 relates to a process for producing paper or cardboard with improved grammage and strength, comprising a forming base containing cellulosic fibers wherein 2 to 15% by weight of cationic starch and 1 to 15% by weight of MFC are added, separately. It is reported that large amounts of starch will increase the strength of the paper produced, and MFC helps in its retention. However, this prior art document does not discuss about the grammage, nor about tests that prove the greater strength of the paper produced.

WO 2010/125247 relates to a method for producing an aqueous paper paste containing a cationic polyelectrolyte (as starch) and a nanofibrillated cellulose (whose definition encompasses MFC) to be used in the manufacture of paper and cardboard, through which they are obtained with high load content and good mechanical strength. 1.5% and 3% by weight of MFC were used to produce papers with grammage between 55 and 60 g/m$^2$. Thus, this prior art document describes a process that uses much larger amounts of MFC and produces papers with smaller grammage.

Finally, the paper "Cellulose nanofibrils-adsorption with poly (amideamine) epichlorohydrin studied by QCM-D and application to paper strength additive" (Ahola et al. *Cellulose* (2008) 15: 303-314) describes the increase in wet and dry strength of the paper as the concentration of microfibrillated cellulose increases. MFC was added at 1, 2, 4, 6, and 10% by weight of cellulosic pulp, yielding paper with a grammage of 60 g/m$^2$, that is, using much larger quantities of MFC and producing papers with smaller grammage.

While some prior art refers to the use of MFC in cellulosic pulp to increase physical and mechanical characteristics of the paper, such as resistance, none describes a process capable of producing high grammage if using very low amounts of MFC, thus evidencing the advantages of the proposed process regarding the low use of raw materials and the biorefinery concept.

The paper, in accordance with the present invention, has improved physical characteristics, such as strength and grammage. The paper is produced through the manufacturing process of cellulosic pulp containing from 1 to 1.5% MFC by weight of cellulosic pulp and starch in the range of 1.0 to 10.0 kg/ton, preferably 5.0 kg/ton, generating a final paper from that pulp in a paper production line having a grammage ranging from 60 g/m$^2$ to 440 g/m$^2$, and such process requires neither diluents nor additives in considerable amounts. Thus, a paper with better physical and mechanical characteristics is produced through this process, using smaller quantities of raw material. Moreover, the addition of MFC causes significant changes in the drain resistance of this pulp, as measured by ° SR degree. The ° SR degree is the measure of the drain resistance degree of the pulp, which increases with higher refinement loads of the cellulosic pulp. By adding MFC to the cellulosic pulp, the same behavior is observed, thus demonstrating one of the enhancements of the addition of MFC in partial replacement of the refining operation in a pulp mill.

SUMMARY OF THE INVENTION

In a first aspect, the present invention describes a paper containing microfibrillated cellulose with improved grammage and strength.

It is a first object of the present invention a paper containing microfibrillated cellulose with special grammage.

In a preferred embodiment, the grammage of the paper produced ranges from 60 to 440 g/m$^2$, and the amount of microfibrillated cellulose in the paper ranges from 1.0 to 1.5% of the paper mass.

Another feature of the invention involves the paper being of Kraft, sackraft, testliner, corrugated or board type.

In a second aspect, the present invention describes a papermaking process using MFC.

A second object of the present invention is a papermaking process comprising the addition of microfibrillated cellulose and starch to a cellulosic pulp.

In a preferred embodiment, microfibrillated cellulose is added in the amount of 1 to 1.5% by weight of cellulosic pulp and starch is added to the cellulosic pulp in the amount of 5.0 kg per ton of pulp.

Another characteristic of the claim is the fact that the cellulosic pulp used may be bleached, brown or mechanical.

These and other objects of the present invention will be detailed in the figures and description below.

DETAILED DESCRIPTION OF THE INVENTION

The examples shown herein are intended only to illustrate some of the numerous embodiments of the present invention, and are not to be construed as limiting the scope of the present invention, but merely to exemplify the large number of possible embodiments.

Minor modifications in amounts or parameters that achieve the results proposed by the present invention should be regarded as within the scope of the invention.

Microfibrillated Cellulose (MFC)

Microfibrillated cellulose, microfibril cellulose, nanofibrillated cellulose or even nanofibers or nanocellulose are terms commonly found which refer to the entanglement of cellulosic fibrils with diameters in the range lower than 1,000 nm, and it has amorphous and crystalline zones composing its structure. MFC is characterized as a type of cellulose in which the microfibers are split into a larger number of microfibrils or even finer fibrils. This creates an increased surface area, granting new characteristics to the product. MFC is used in this invention primarily as a strength agent, for internal paper bonding and as a modifier of the physical paper structure.

MFC is typically derived from wood sources and is one of the most sustainable alternatives on the market. However, it can be produced from any cellulosic fiber source, be it mechanical, non-bleached and bleached, in addition to any biomass source derived from wood and non-wood.

The MFC surface area is the special characteristic of this substance: it is possible, with only one gram of MFC, to cover up to 200 $m^2$ of physical space. This characteristic is due to the large number of hydroxyl groups (—OH) available in microfibers, which are highly hydrophilic and capture near water. An MFC microfiber is capable of capturing 40 times more water than its own weight.

Since MFC is a highly hydrophilic material, it can act as an advanced rheology modifier, providing very interesting spray characteristics and exceptionally high viscosity at rest. MFC is known for its shearing and non-Newtonian behavior, and it also shows potential as a stabilizer, especially in stabilizing emulsions (water in oil or oil in water).

Figure 1:
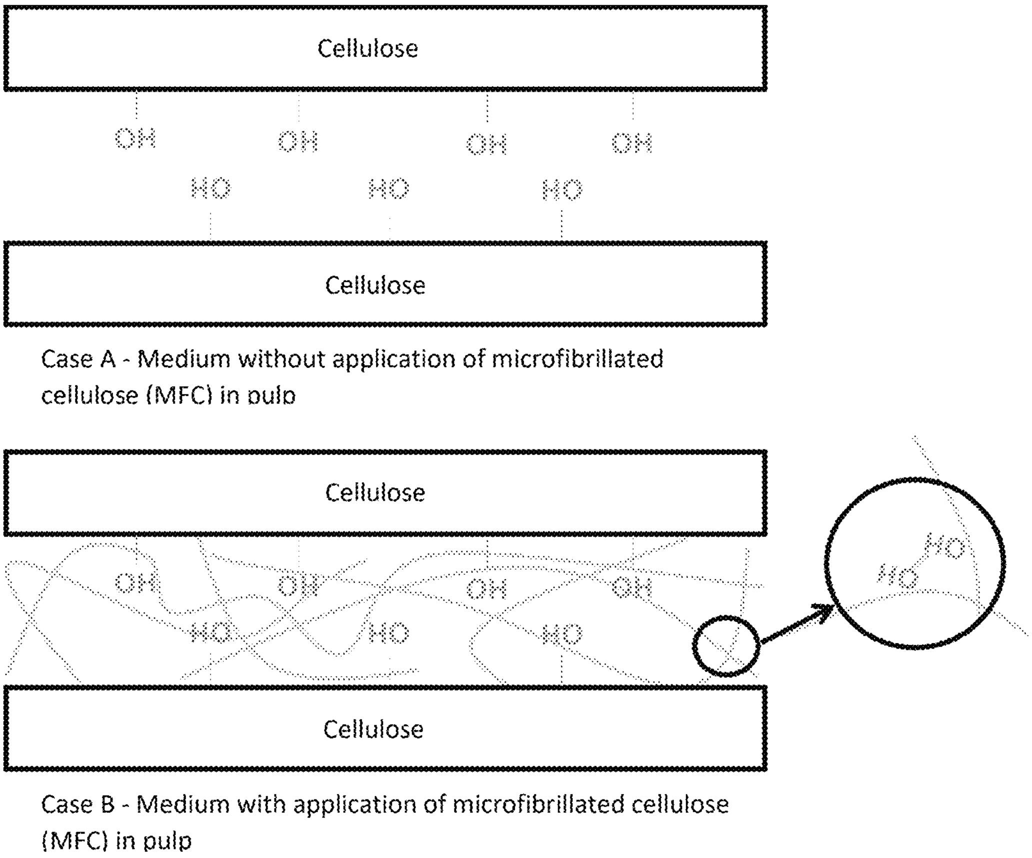
FIG. 1 shows a schematic representation of the difference between cellulose layers with and without MFC in their composition, thus evidencing the greater number of bonds between free hydroxyls.

MFC is a large network of bonds between the paper layers, ensuring that the fiber-MFC-fiber bond interface between the layers of paper expresses its maximum potential due to the OH groups exposed (FIG. 1) and its high surface area. The MFC fills both the macro and the microporosity of the paper produced, changing the bond structure between the layers and forming a perfect bond.

The MFC multifunctionality also allows it to partially adopt additives and stabilizing ingredients, like surfactants. Moreover, MFC is potentially a strength additive. Due to these characteristics, there has been a growing interest in the use of MFC in applications such as coatings, adhesives, electronics, cosmetics and many others.

The MFC microfiber size is also important in determining its functionality. The increase of the microfiber length has beneficial effects on the tensile, elasticity and resistance properties of the composites in wood and paper.

MFC Production

According to the present invention, the production of MFC can be subdivided into 5 major steps:

1. $1^{st}$ dilution;
2. Treatment;
3. mechanical processing;
4. $2^{nd}$ dilution; and
5. storage.

The first step consists in the dilution of the bleached or unbleached kraft pulp to 2% of consistency, which is ideal for MFC processing.

The second step is the chemical-enzymatic treatment. In this step, the preparation of the pulp for processing takes place. First, the pH of each container is adjusted to 6.0 using aluminum sulphate ($Al_2(SO_4)_3$). The pulp in neutral medium is heated to 35-40° C. for 50-60 minutes, and then treated with 125 g of enzyme per ton of dry pulp, with this enzyme belonging to the endoglucanase family. The product is kept dispersed for 25 minutes in a cowles shaker. After this period, the enzymatic action is halted by adjusting the pH to 13-14 with liquid soda (sodium hydroxide, NaOH) at a dosage of approximately 200 g per ton of pulp.

The third step is the processing step, where the pulp is transferred to a vertical mechanical mill through a pump, and processed. The mill comprises aluminum oxide stone ($Al_2O_3$) at 2% cSt (Consistency). The process is carried out twice and it must be noted that, after the $1^{st}$ grinding, whole fibers can still be visualized, but not in the second grinding, thus evidencing the micro/nano size scale of the fibers. The sizes of the microfibers produced after this step are shown in table 1, while table 2 shows the different characterization parameters of microfibers at 2% cst.

TABLE 1

Pulp diameter range and frequency of cellulosic microfibrills per production step:

| Sample | Diameter range | Frequency (%) |
|---|---|---|
| Pulp | (15-40) µm | 90 |
| | (−25) µm | 47 |
| Treated pulp | | 81 |
| | | 38 |
| $1^{st}$ grinding | | 86 |
| | | 46 |
| $2^{nd}$ grinding (0.25 g/L) | (50-250) nm | 73 |
| | (−50) nm | 24 |
| $2^{nd}$ grinding (0.05 g/L) | | 76 |
| | | 23 |
| $2^{nd}$ grinding (0.025 g/L) | | 51 |
| | | 48 |

TABLE 2

Characterization parameters of the pulp and microfibers at 2% cSt:

| Parameter/Phase | Pulp | Treated pulp | $1^{st}$ pass | $2^{nd}$ pass |
|---|---|---|---|---|
| pH | 6.7 | 12.9 | 12.9 | 12.7 |
| Viscosity (cps) | 1123.5 | 689.3 | 2030.0 | 4893.3 |
| Turbidity (NTU) | 13.8 | 17.4 | 28.9 | 91.8 |

The fourth step is the step of diluting the pulp treated and processed in a tank until it reaches a 0.8% cSt consistency, with the pulp entering in and exiting from the filter via openings, and stirring with a blade motor to avoid sedimentation. The pulp is subsequently filtered through a 0.05 mm filter.

The fifth and final step is the storage, where the diluted pulp is directed to the appropriate tank under stirring.

The calculation of the theoretical energy consumption of the production of CFMs can be carried out using the following formula:

$$C = \frac{v \cdot i \cdot \sqrt{3} \cdot fp}{P}$$

Where v is the tension (V), i is the mean current (A), fp is the power factor of a motor in horses (cv) and P is the production/hour (dry kg). The total energy expenditure is estimated at 7075.6 KW·h/t for the preparation of two tanks.

It must be noted that the present invention may be also carried out using only the step 3, of mechanical processing, to produce MFC, thereby reducing the energy expenditure of the process.

Characterization of MFC Fibers Used in Cellulosic Pulp

Cellulosic pulps are rich in fibers, but the fibers are not the only anatomical elements they possess. Fibers, fiber fragments, lignin, parenchyma cells and vessel elements are combined into a rich blend. A pulp containing all these organic components is considered a kraft pulp.

In order to purify a brown pulp by removing the other undesirable components (lignin, extractives and chromophores), bleaching is performed. Bleaching is the factory operation where cellulose pulp receives reductive and oxidative chemical treatments, followed by washes or not. These undesirable components are removed during the washes. It is desirable that the minimum degradation of the fibers occur during this process, both from the point of view of increasing profitability and from the point of view of strength. After bleaching, the pulp is considered white/bleached.

The present invention performed the characterization of the cellulosic fibers, both before and after bleaching. However, it should be noted that the present invention may use brown, bleached or mechanical pulps, depending on the type of paper to be produced. Practical examples, but not limited thereto, are the sackraft paper, which is produced with brown long fiber MFC, and paperboard, which is produced with bleached short fiber MFC in the cover layer and brown short fiber MFC in the medium and base layers.

Figure 2:
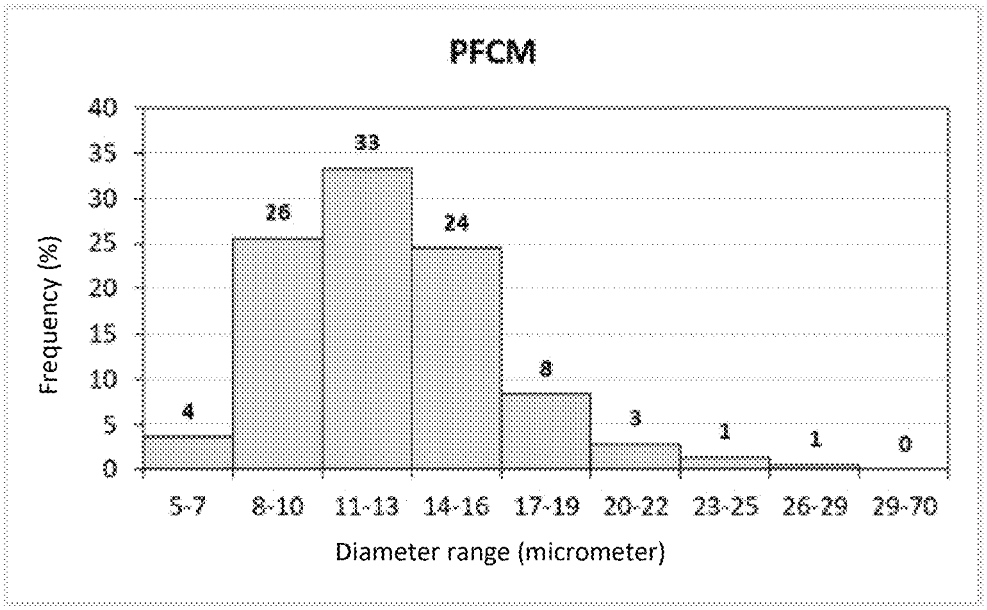
FIG. 2 shows the size distribution of (A) brown short fibers of cellulosic pulp in micrometers and (B) brown short fiber MFC in nanometers.
Figure 2:
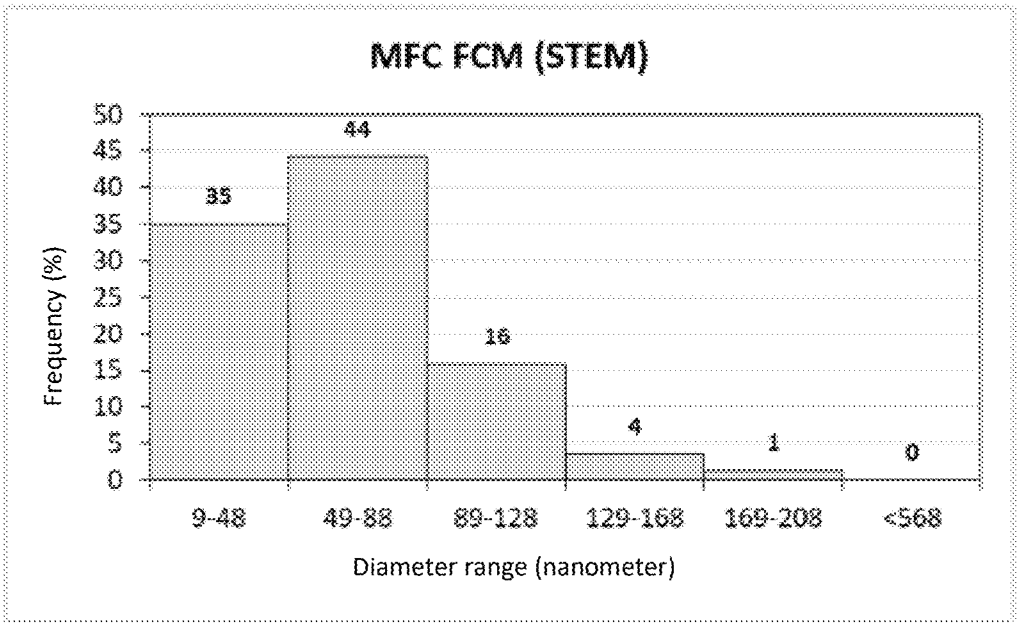
Figure 3:
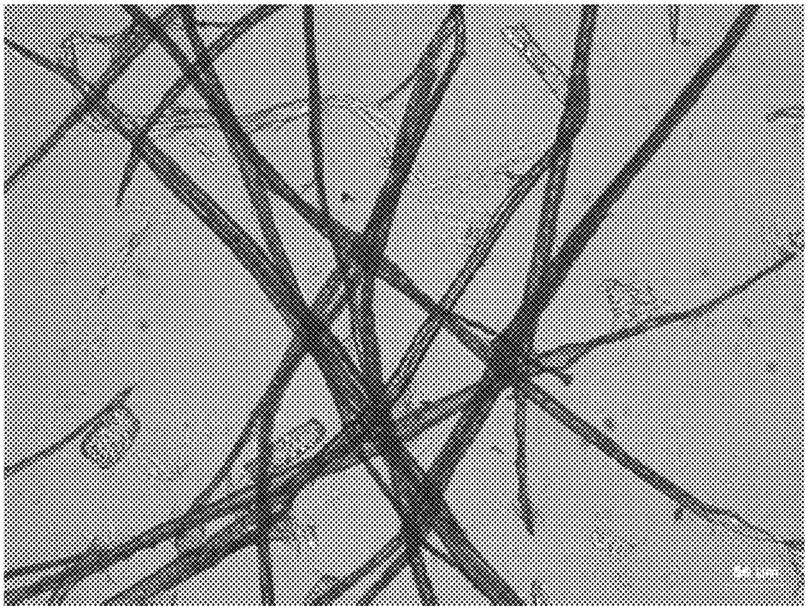
FIG. 3 shows an optical microscopy image at 200× of magnitude (A) and another electron microscopy image at 23,900× of magnitude of the brown short fibers and of the MFC produced with that fiber, respectively.
Figure 3:
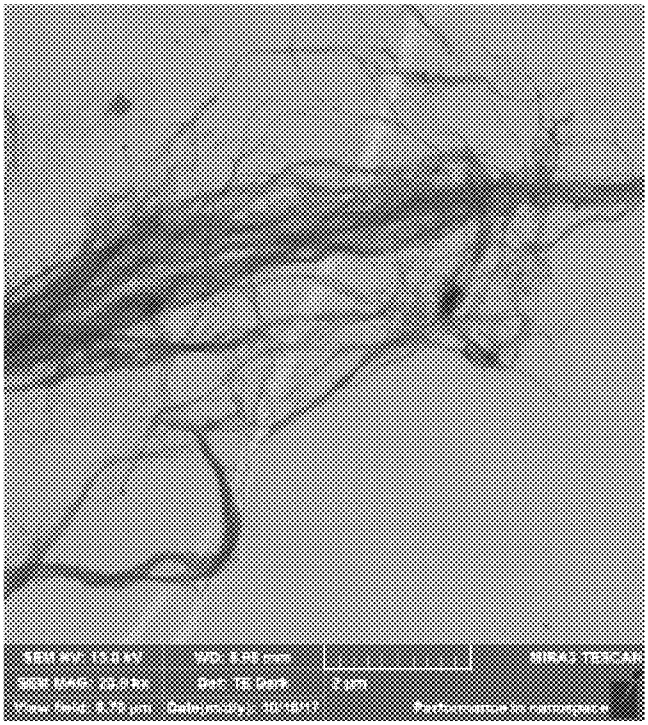

Initially, the characterization of the short brown fibers was performed by optical and electron microscopy, obtaining a larger representative range with diameter varying from 0 to 568 nanometers in the electron microscopy for the MFC of this fiber (FIG. 2). Electron microscopy imaging was necessary to define the real size of MFC from the fiber. The images at 200 times and 23,900 times of magnitude for optical and electronic microscopy, respectively, give an idea of the sizes of the fibers and MFC in a projection (FIG. 3).

Figure 4:
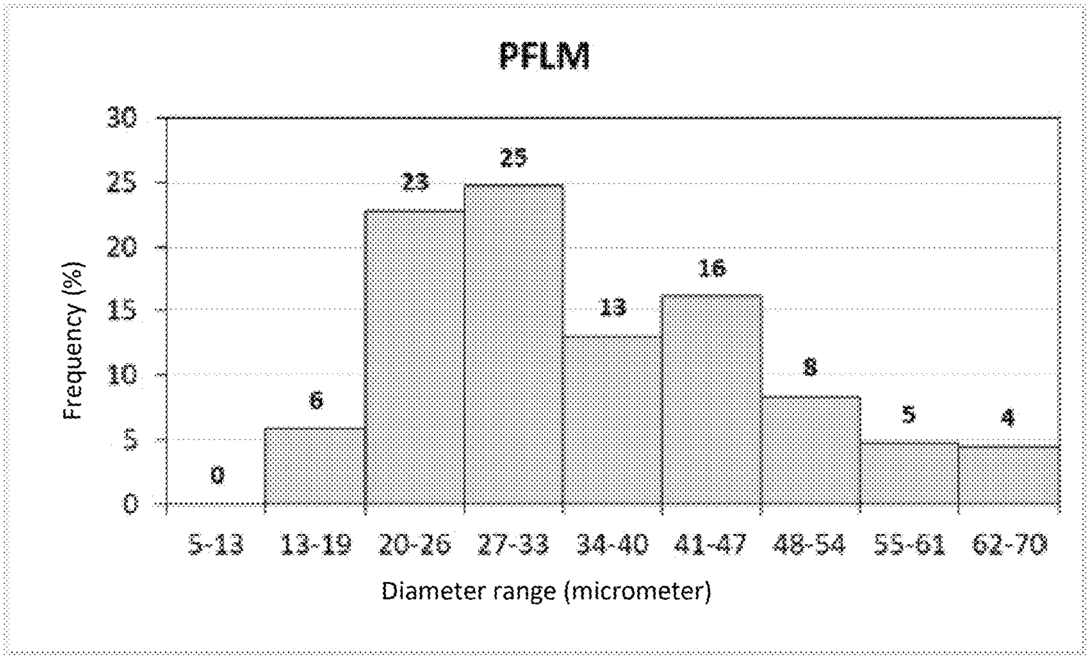
FIG. 4 shows the micrometer (A) size distribution of the brown long fibers in the cellulose pulp and in nanometer (B) of the MFC produced with this cellulose pulp.
Figure 4:
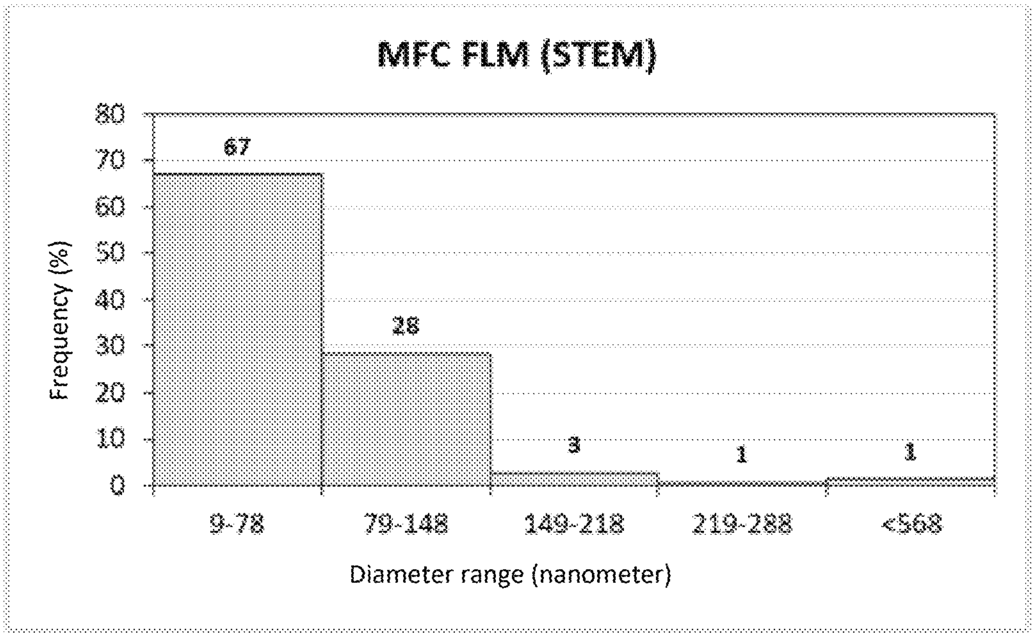
Figure 5:
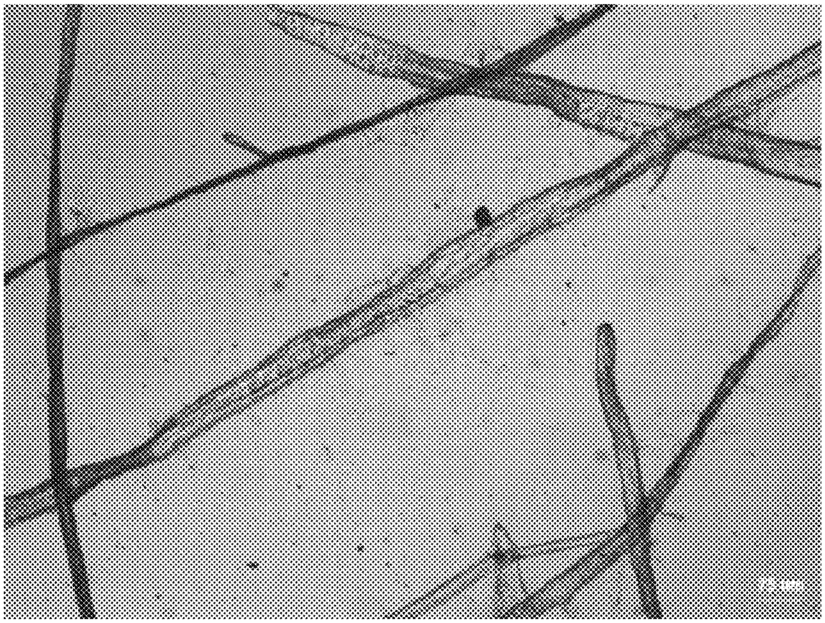
FIG. 5 shows an optical microscopy image at 100× of magnitude (A) and another electron microscopy image at 7,540× of magnitude of the brown long fibers and of the MFC produced with that cellulosic pulp, respectively.
Figure 5:
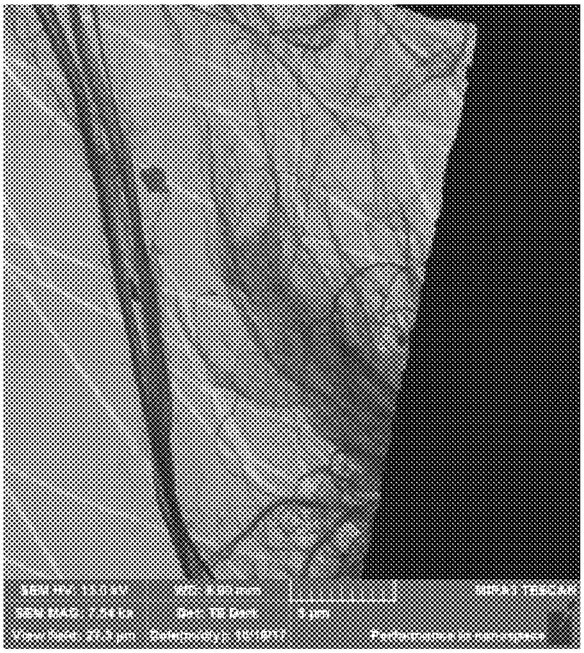

Then, the characterization of the brown long fibers was carried out again, both by optical and electronic microscopy. A larger representative range with a diameter varying from 9 to 568 nanometers was obtained for MFC through electron microscopy (FIG. 4). Electron microscopy imaging was necessary to define the real size of MFC from the e fiber. The images at 100 times and 7,400 times of magnitude for optical and electronic microscopy, respectively, give an idea of the sizes of the fibers and MFC in a projection (FIG. 5).

Figure 6:
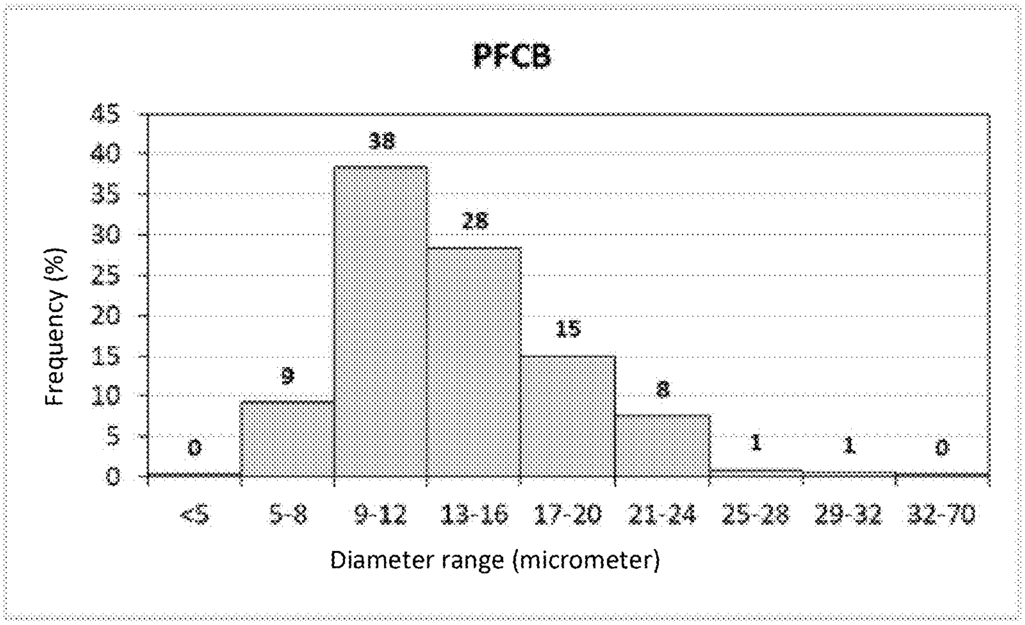
FIG. 6 shows the size distribution in (A) bleached short fibers in micrometers and the MFC and (B) produced from the bleached short fibers.
Figure 6:
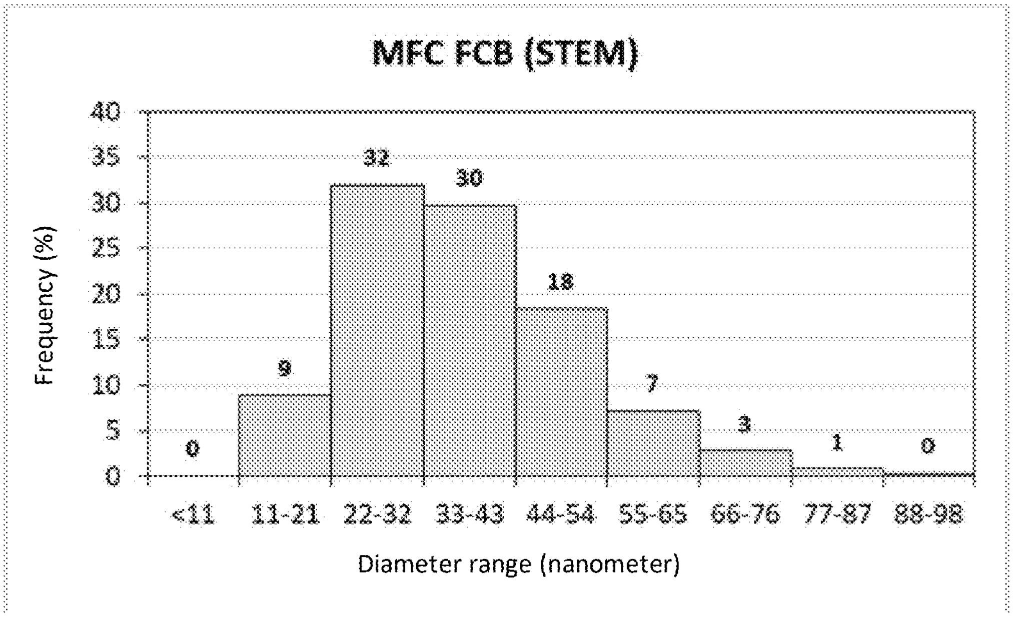
Figure 7:
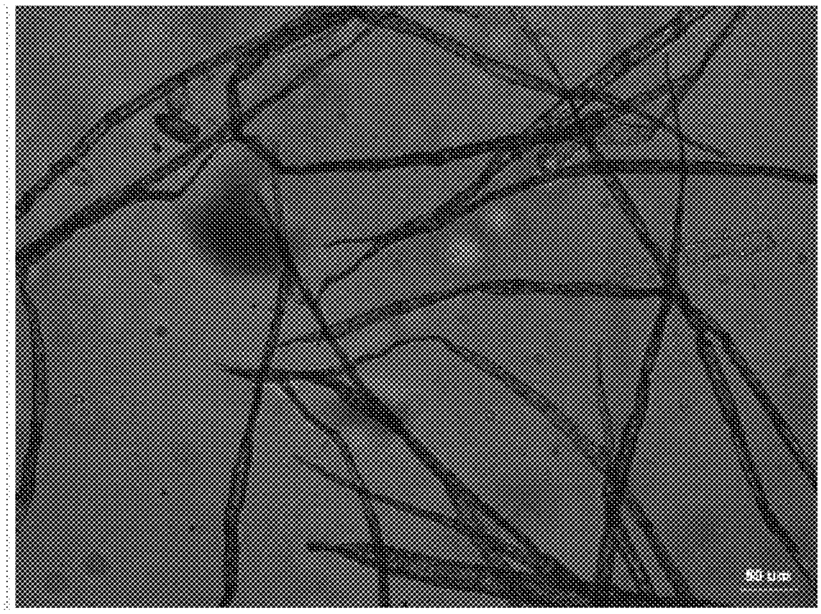
FIG. 7 shows an optical microscopy image at 200× of magnitude (A) and another electron microscopy image at 33,000× of magnitude of the bleached short fibers and of the MFC produced with that pulp.
Figure 7:
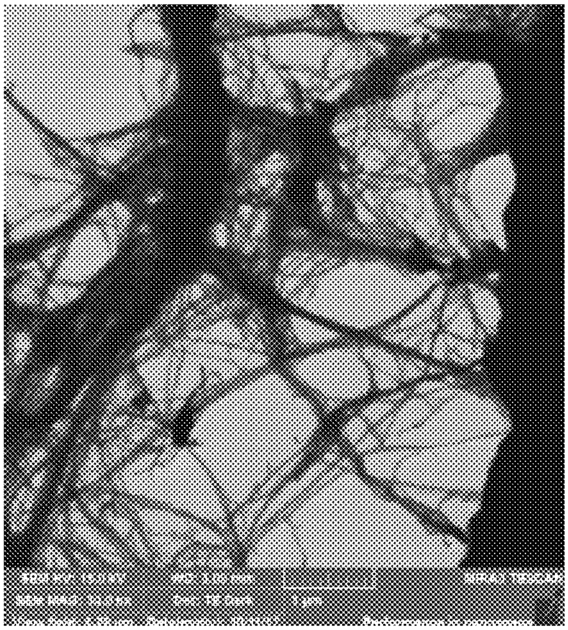

Finally, the characterization of the bleached short fibers was performed, again both by optical and electronic microscopy. A larger representative range with a diameter varying from 11 to 98 nanometers was obtained for MFC through electron microscopy (although other ranges, such as 33-43, are also significant) (FIG. 6). Electron microscopy imaging was necessary to define the real size of MFC from the fiber. The images at 200 times and 33,000 times of magnitude for optical and electronic microscopy, respectively, give an idea of the sizes of the fibers and MFC in a projection (FIG. 7).

Thus, MFCs of brown and bleached short fibers, as well as of brown long fibers, were considered to have a satisfactory size for the production of paper with improved characteristics.

The zeta potential of MFCs produced was also measured. Zeta potential is a stability parameter, since the residual charge on the surface can repel one form the others and destabilize the medium containing them. The different size of the microfibrils can result in interlacing, which influences the value difference. Additionally, the presence of residual hemicelluloses may also change the reading of this parameter due to its agglutination capability. The values found are in agreement with the zeta potential of microfibrils (potentials between −56.96 and −26.86 mV).

TABLE 3

Values obtained from zeta potential analysis:

| Sample | Value 1 | Value 2 | Mean (mV) | Std. Deviation |
|---|---|---|---|---|
| Brown short fiber MFC | −37.6 | −36.8 | −37.2 | 0.57 |
| brown long fiber MFC | −33.7 | −40.3 | −37.1 | 4.67 |
| White short fiber MFC | −33.1 | −32.8 | −33.0 | 0.21 |
| Deionized Water | −19.3 | −19.3 | −19.3 | 0.00 |

Application of MFC to Pulp for Producing Kraft Paper

Kraft paper or kraftliner paper is a type of paper made with a mixture of short and long cellulose fibers or not, from wood kraft pulps.

The use of microfibrillated cellulose as a strength additive was evaluated in the production of kraft paper in the paper machine 4 (MP4). Between 1.0 and 1.5% of MFC were dosed in the mixing tank together with 5.0 kg/t of cationic starch. There was no need to reduce the machine speed, there were no production breaks due to difficulties encountered due to drainage, the paper retention level remained high and, additionally, paper formation remained good without the need for additional adjustment to the machine.

It is possible to observe that the MFC addition causes the modification of the physical paper structure, which impacts on the phenomena of water drainage and movement during its formation. This increase is expected, since the number and frequency of bonding is increased due to the high specific surface of MFC, which promotes a great interaction at the interface with the fibers surface that form the paper. Therefore, the largest number of bonds and interactions of MFC with the surface of the fibers constituting the paper structure justifies the production of papers with improved physical and mechanical properties.

These physical and mechanical properties were measured through comparisons of tests common to paper production and cellulose industry in general. Measurements such as the Schopper Riegler degree or ° SR, tensile strength (strength until paper breakage), stretching (another strength measure until the paper breakage), bursting or burst resistance (strength to the beginning of paper breakage), tear resistance (strength required to keep paper breakage until complete separation), Tensile Energy Absorption (TEA) (another strength measurement of total paper breakage), Short Crush Test (SCT) (compressive strength), Ring Crush Test (RCT) (another measurement of compressive strength), Scott (Ply) Bond (resistance to delamination or loss of layers), Gurley (resistance to airflow which indicates the behavior of paper macro and microporosity), Water Retention Value (WRV) (measurement of the amount of water retained in the paper), Drainage Freeness Retention (DFR) (draining time) and Modulus of Elasticity (MOE) (measurement of the material stiffness). It shall be noted that some tests are measured as indexes, which is the quotient of the strength analyzed by the paper weight.

Figure 8:
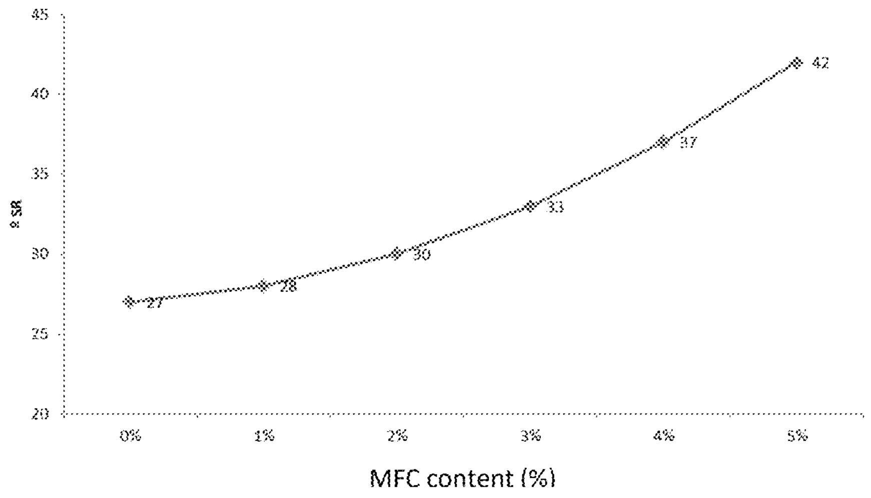
FIG. 8 shows the variation of Schopper Riegler grade (° SR) with the increasing concentration of MFC in the cellulosic pulp for the production of kraftliner paper containing a mixture of long and short fibers, and which also represents the behavior of the addition of MFC in any type of kraft, semi-chemical or commercial cellulosic pulp.
Figure 9:
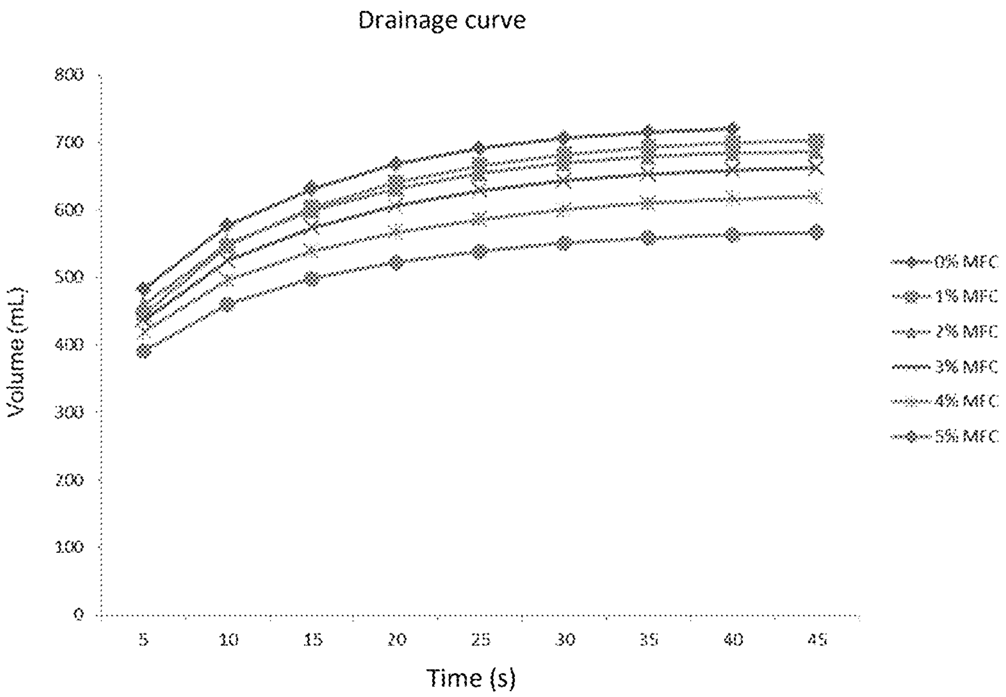
FIG. 9 shows the drainage behavior with increasing time and at different concentrations of MFC in the cellulose pulp for the production of kraftliner paper containing a mixture of long and short fibers.

When adding MFC up to 1.5% by mass in the cellulosic pulp, the ° SR of the pulp can increase up to 3 points (FIG. 8), while for the drainage curve, it is possible to observe the reduction of up to 100 ml or more of water drained in the first 10 seconds of paper formation (FIG. 9).

Figure 10:
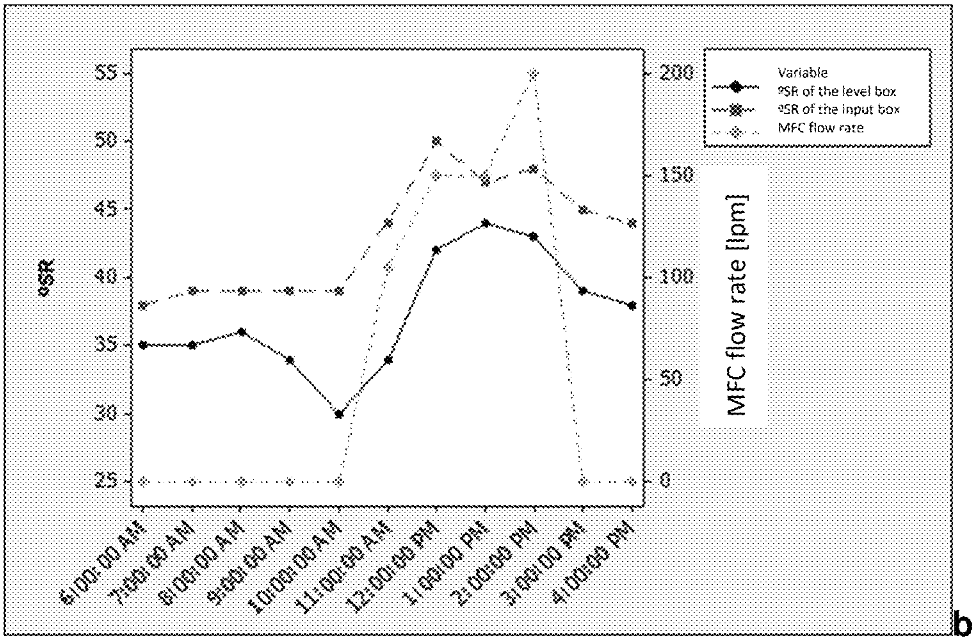
FIG. 10 shows the effect of MFC dosage on Schopper Riegler grade (° SR) in the level box and in the input box of an industrial paper machine over time.
Figure 11:
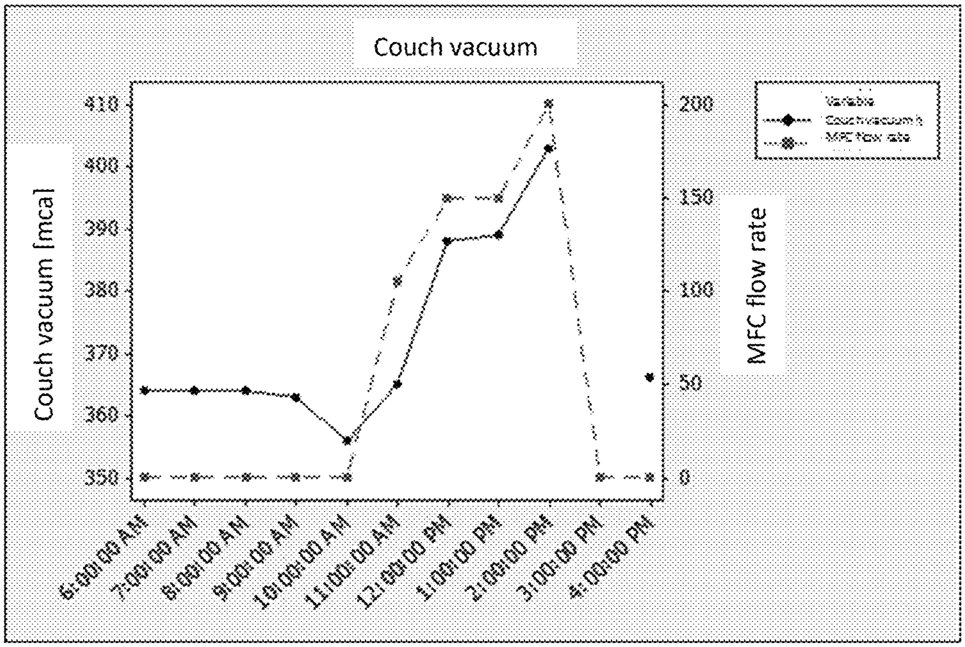
FIG. 11 shows the effect of MFC dosing on the vacuum of the Couch roll in an industrial paper machine over time.
Figure 12:
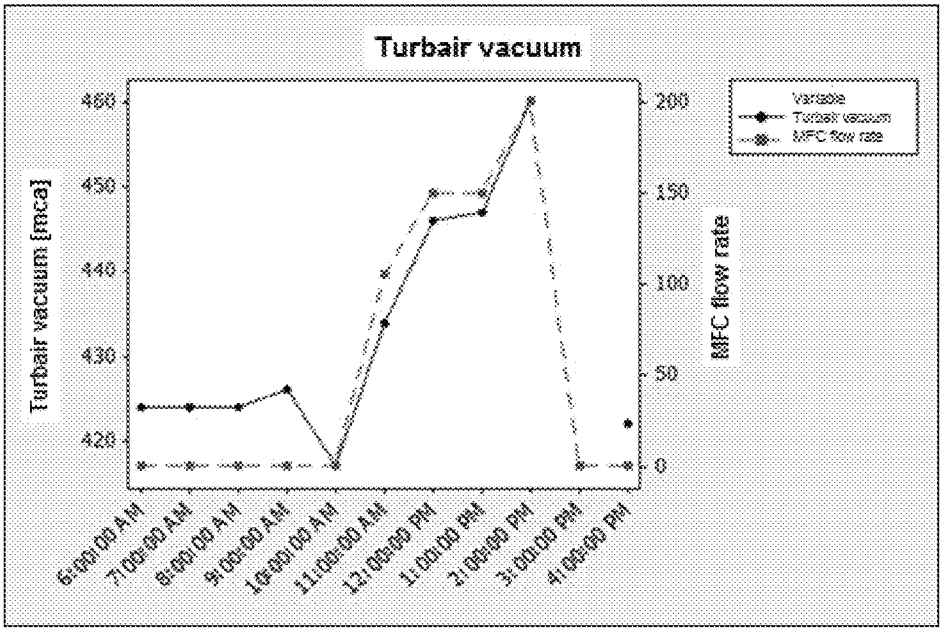
FIG. 12 shows the effect of MFC dosing on the vacuum of the Turbair system in an industrial paper machine over time.
Figure 13:
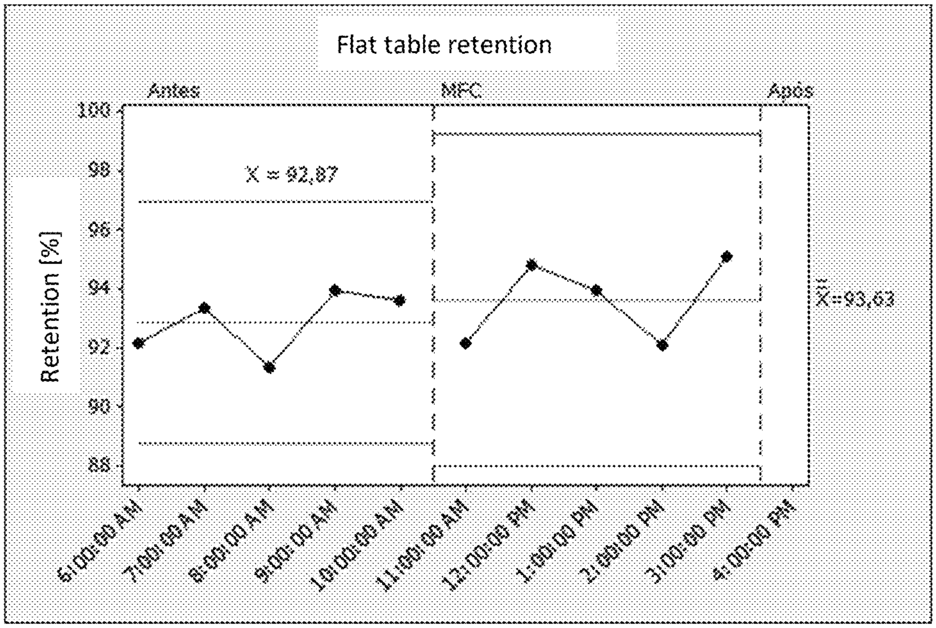
FIG. 13 shows the effect of MFC dosing on flat table retention in an industrial paper machine over time.
Figure 14:
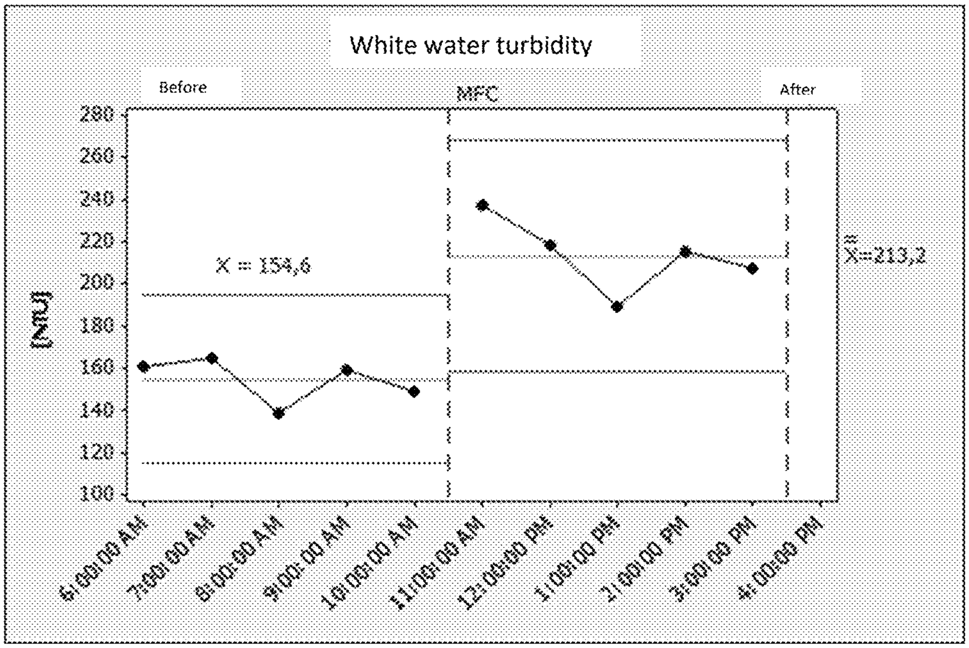
FIG. 14 shows the effect of MFC dosing on turbidity of white water in an industrial paper machine over time.

The drain resistance of the pulp from the level box and in the input box was considerably affected by the dosage of 1.0 to 1.5% of MFC, increasing by approximately 20% the ° SR (FIG. 10). The vacuum in the Couch (roll of the wet section of the machine with its own vacuum system) and Turbair (vacuum system integrated into the machine) increased by about 10% (FIGS. 11 and 12), while the flat table retention (water mirror advance) remained high during all production, above 93% and practically constant, despite the increase in the amount of MFC (FIG. 13). These values were indicative of the greater drainage difficulty at the table. However, it was not necessary to slow down the machine to produce satisfactory results on the final paper. The turbidity of white water (FIG. 14) increased about 40%, which is indicative of the loss of cellulosic fibers or even MFC to water. However, this value can be explained by the high fiber concentration in the pulp.

Figure 15:
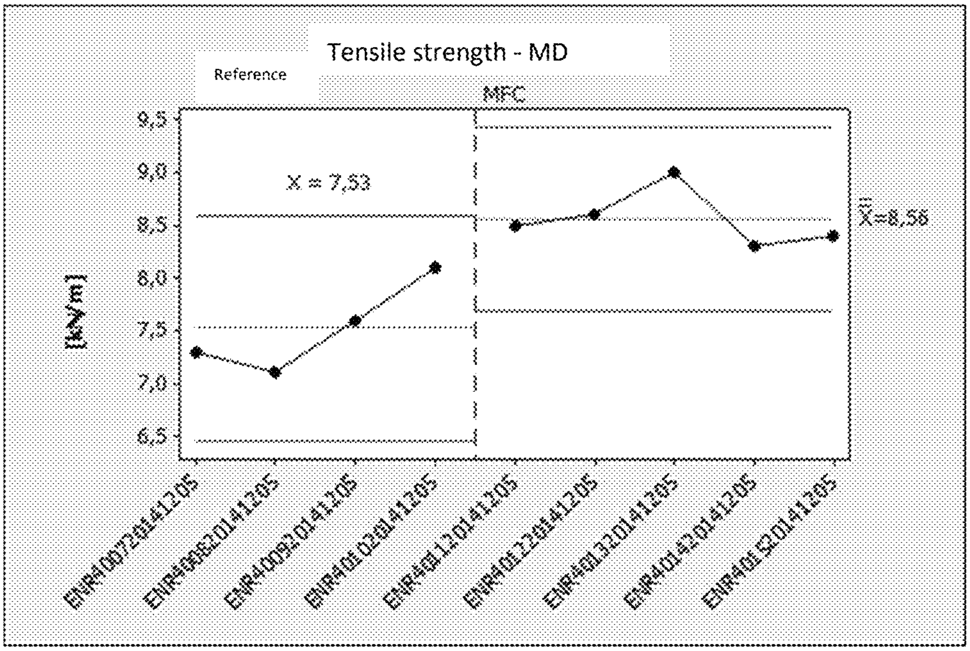
FIG. 15 shows the comparison of the tensile strength in the longitudinal direction of the reference paper with the paper produced with the cellulosic pulp with MFC in various batches.
Figure 16:
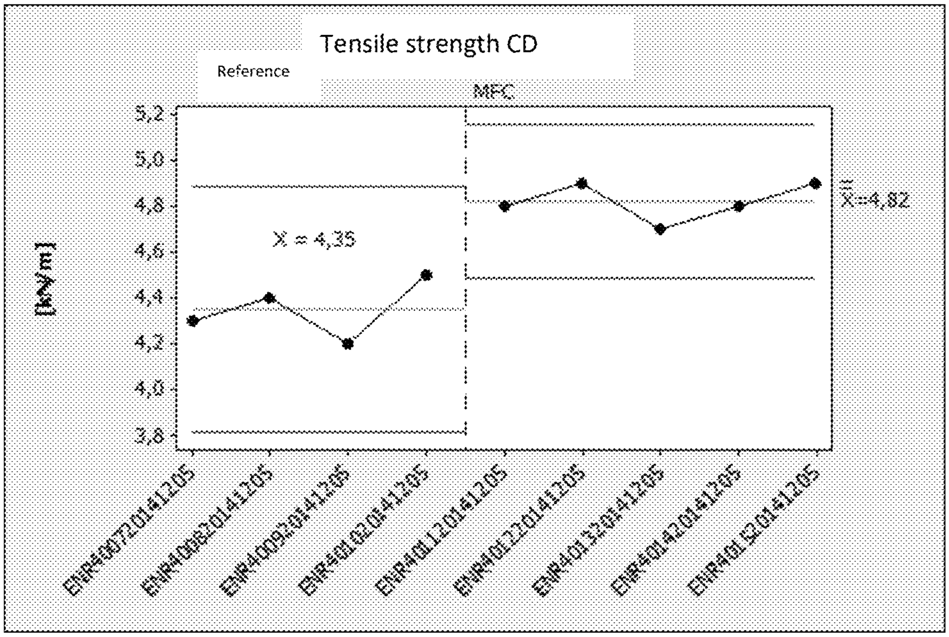
FIG. 16 shows the comparison of the tensile strength in the transverse direction of the reference paper with the paper produced with the cellulosic pulp with MFC in various batches.
Figure 17:
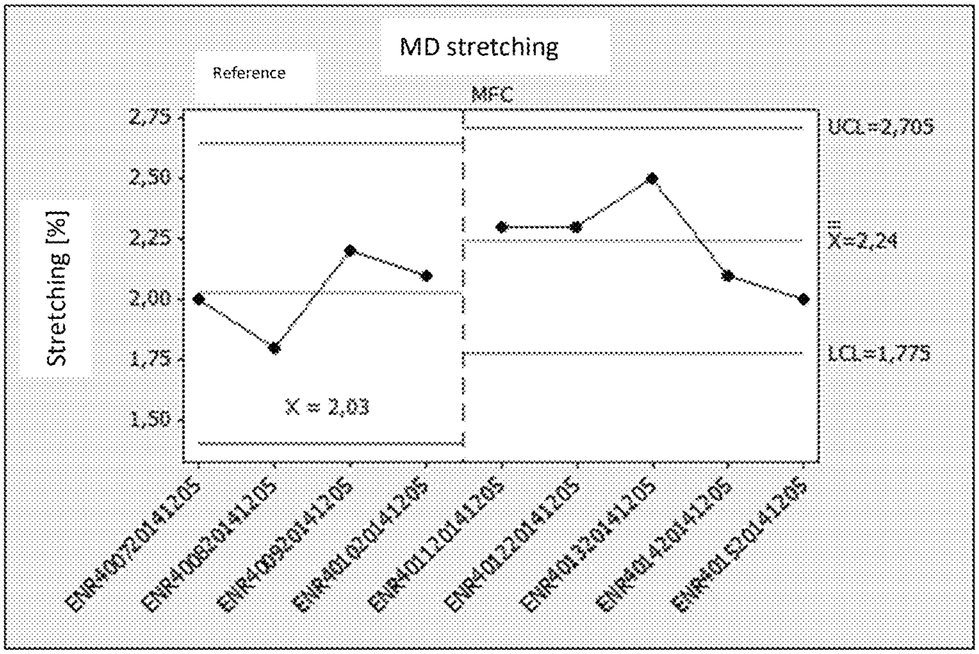
FIG. 17 shows the comparison of stretching in the longitudinal direction of the reference paper with the paper produced with the cellulosic pulp with MFC in various batches.
Figure 18:
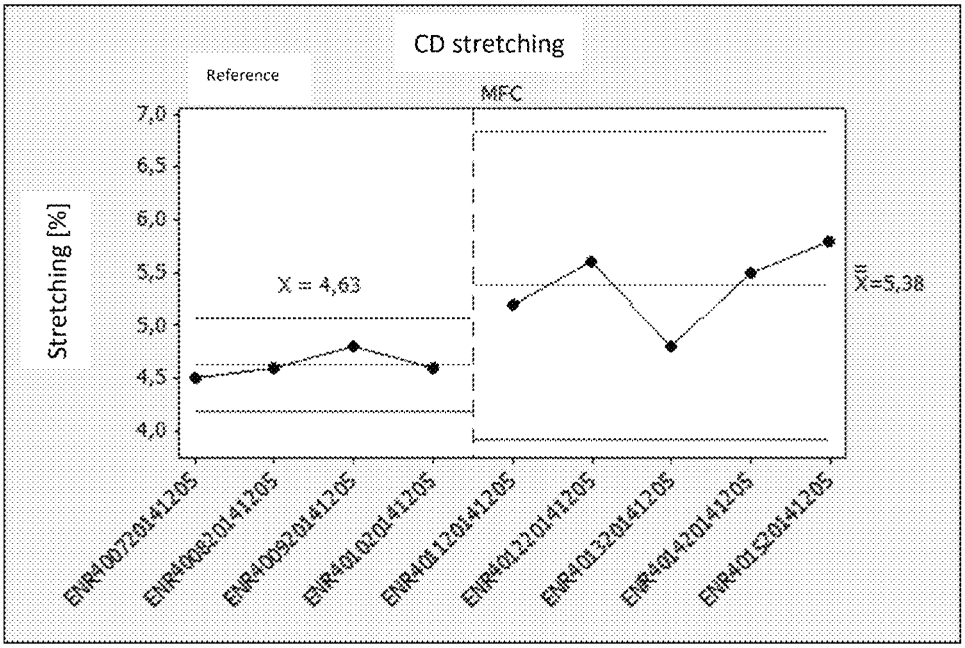
FIG. 18 shows the comparison of stretching in the transverse direction of the reference paper with the paper produced with the cellulosic pulp with MFC in various batches.
Figure 19:
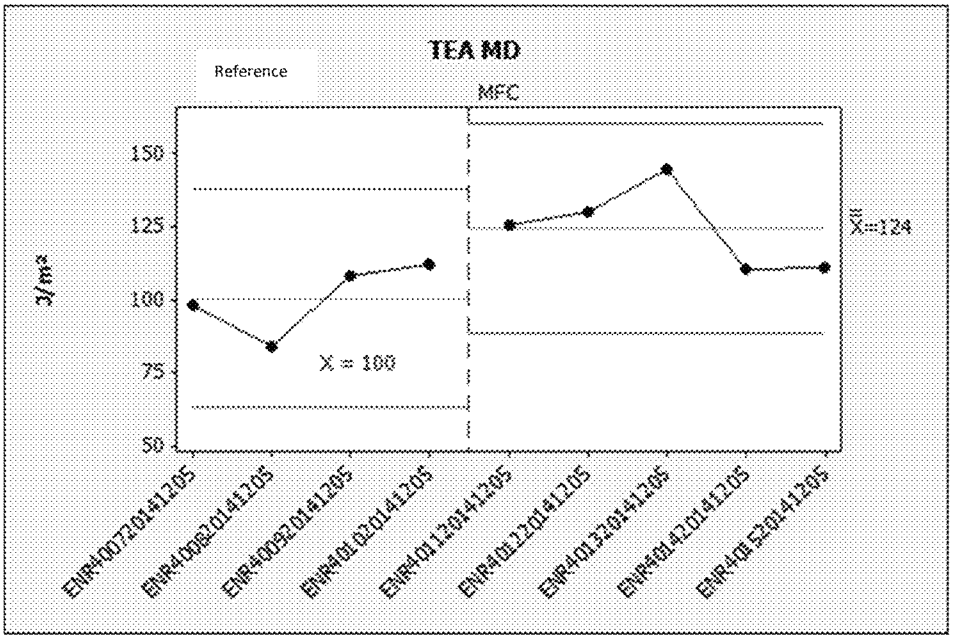
FIG. 19 shows the comparison of the Tensile Energy Absorption (TEA) in the longitudinal direction of the reference paper with the paper produced with the cellulosic pulp with MFC in various batches.
Figure 20:
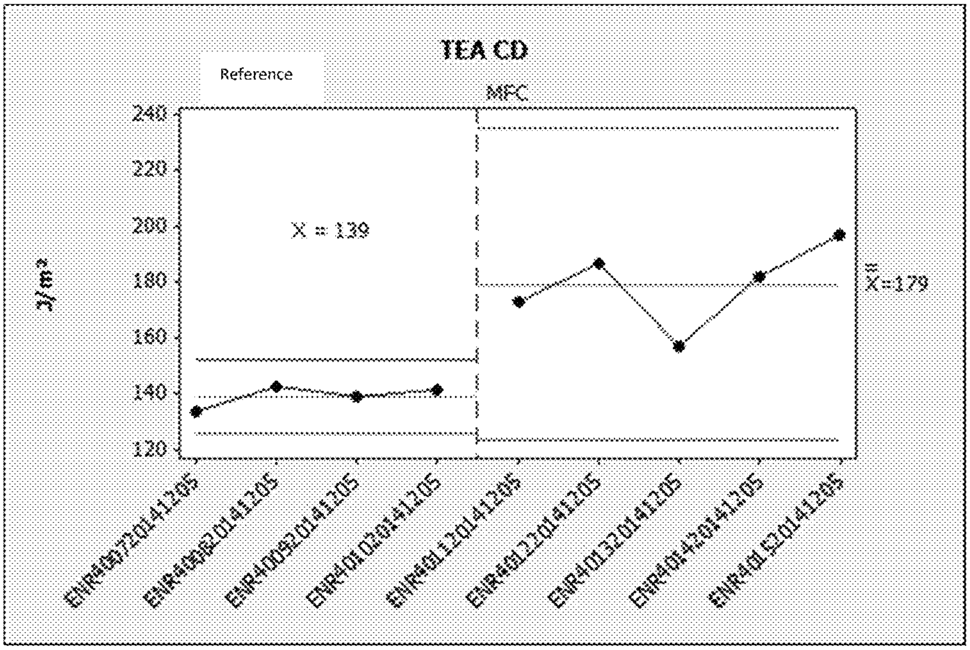
FIG. 20 shows the comparison of the Tensile Energy Absorption (TEA) in the transverse direction of the reference paper with the paper produced with the cellulosic pulp with MFC in various batches.
Figure 21:
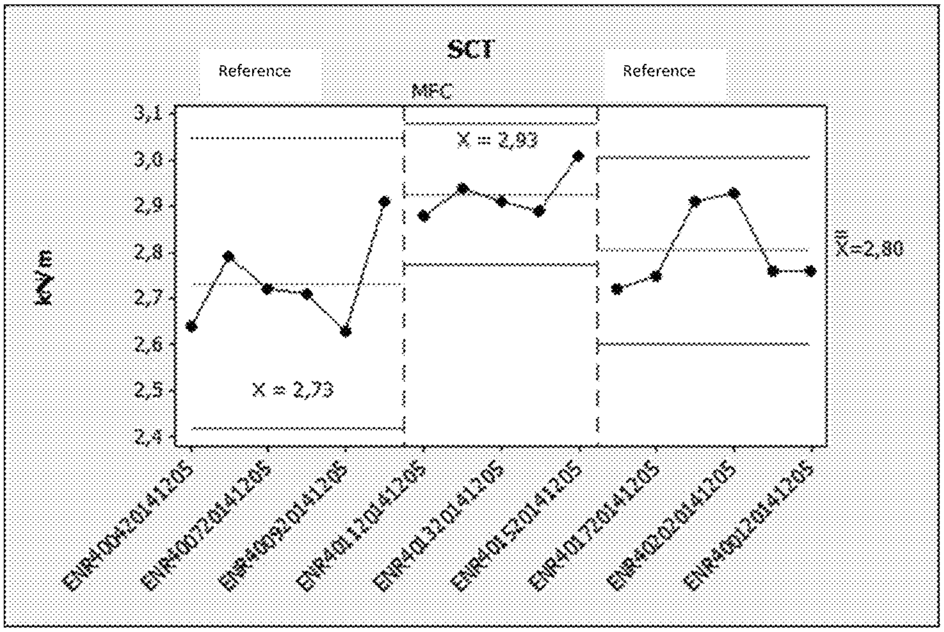
FIG. 21 shows the comparison of Short Crush Test (SCT) of the reference paper with the paper produced with the cellulosic pulp with MFC in various batches.
Figure 22:
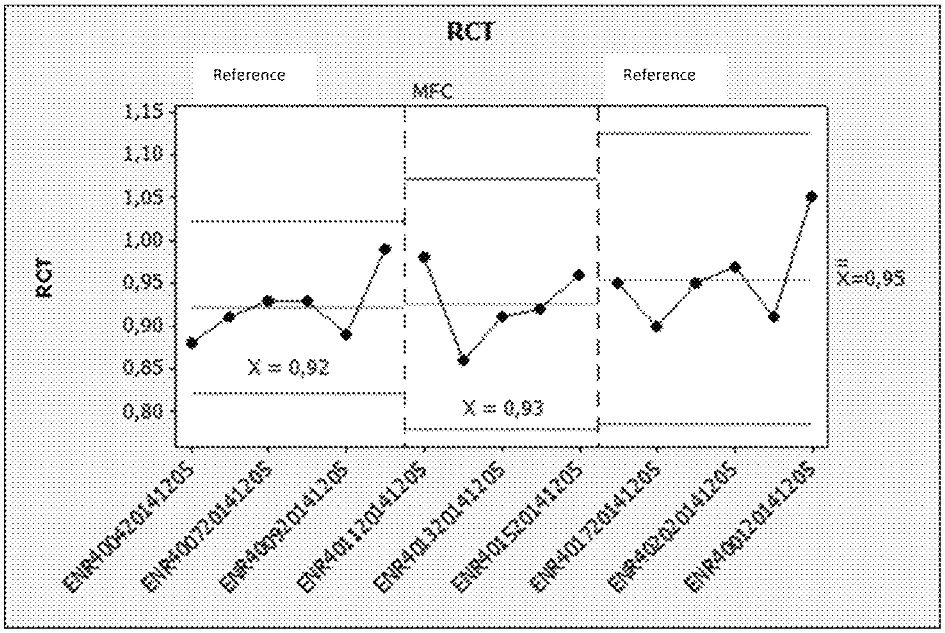
FIG. 22 shows the comparison of Ring Crush Test (RCT) of the reference paper with the paper produced with the cellulosic pulp with MFC in various batches.
Figure 23:
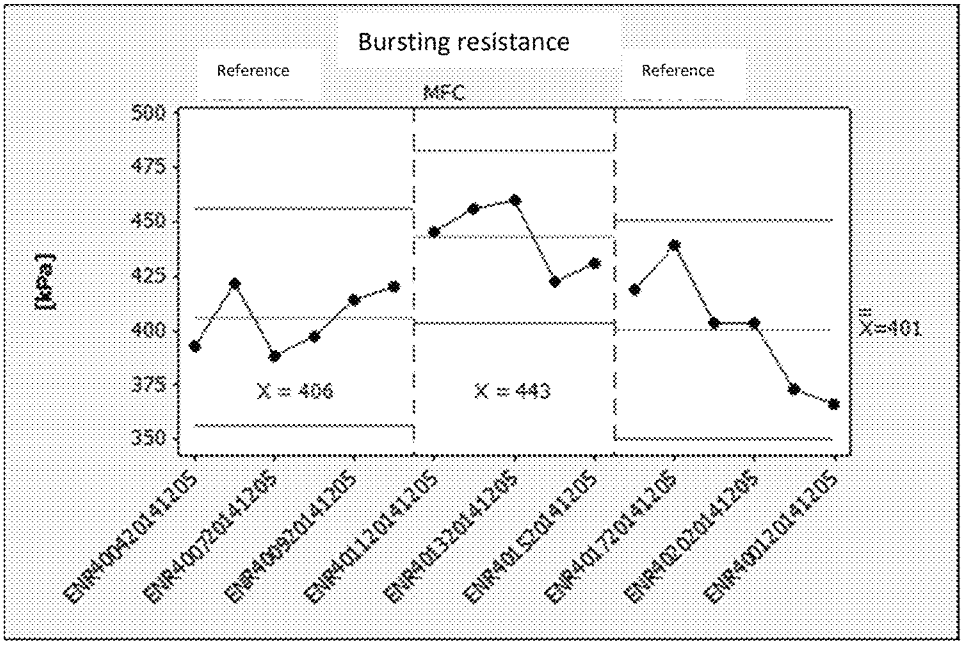
FIG. 23 shows the comparison of bursting resistance of the reference paper with the paper produced with the cellulosic pulp with MFC in various batches.
Figure 24:
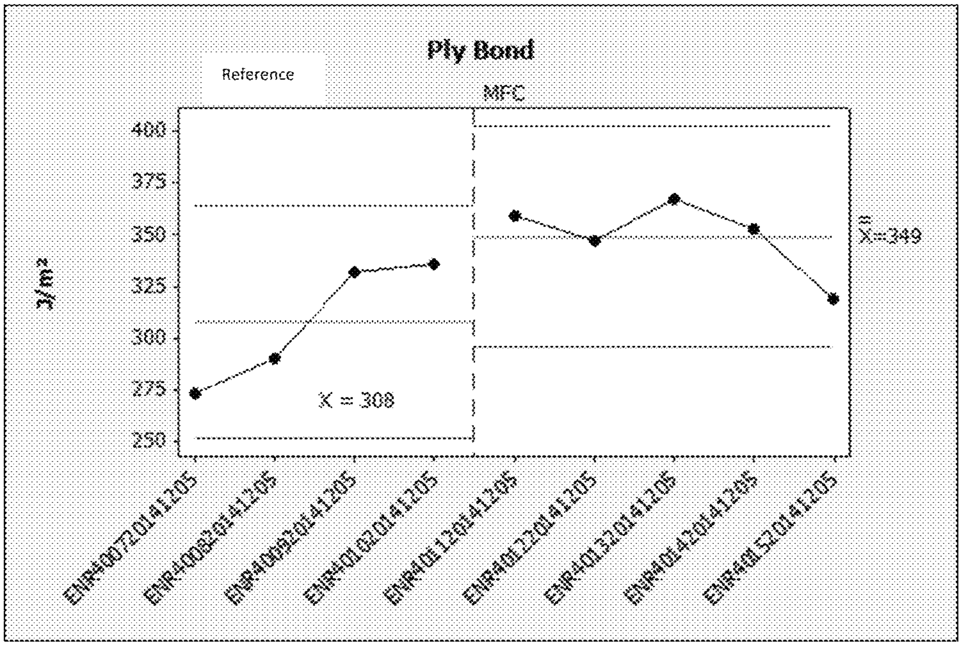
FIG. 24 shows the comparison of Scott (Ply) Bond of the reference paper with the paper produced with the cellulosic pulp with MFC in various batches.
Figure 25:
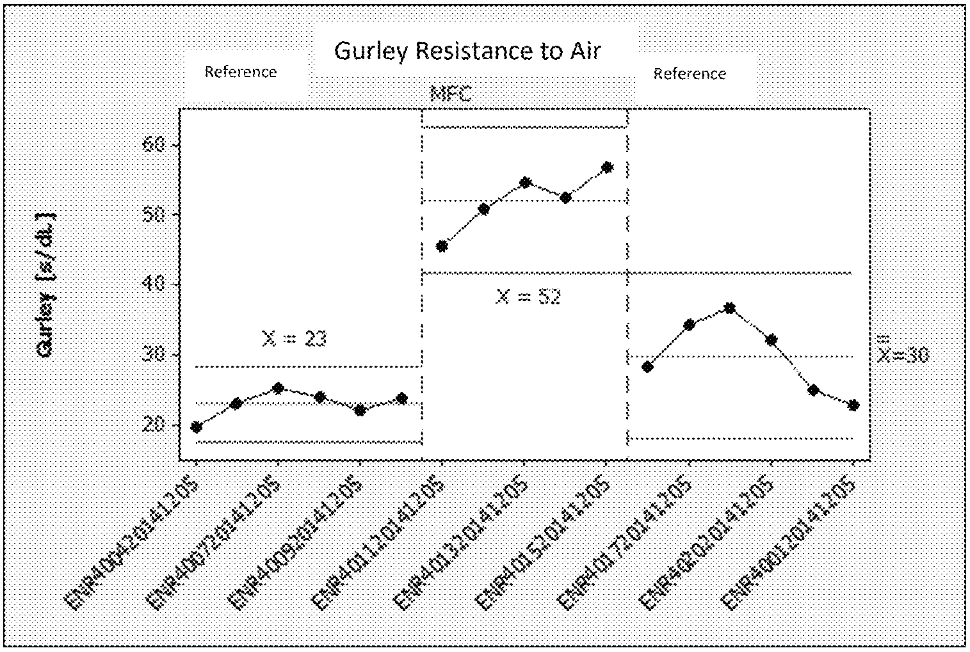
FIG. 25 shows the comparison of the resistance to airflow (Gurley) of the reference paper with the paper produced with the cellulosic pulp with MFC in various batches.

The tensile strength, stretching and TEA were calculated as the geometric mean of the tensile measurement in the MD (Machine Direction, or direction of the papermaking machine) and CD (Cross Direction, or direction opposite to the paper machine), in order to evaluate physical and mechanical characteristics without the effect of paper orientation. There was an average 12% increase in tensile strength when compared to the reference paper (FIGS. 15 and 16). There was an increase in elongation (FIGS. 17 and 18) and in TEA MD and CD in 24 and 29%, respectively (FIGS. 19 and 20). The SCT of paper with MFC had a small increase of 7% (FIG. 21), whereas the RCT had practically no gain (FIG. 22). Bursting resistance increased by about 10% on paper with MFC (FIG. 23), while Scott (Ply) Bond increased by about 13% (FIG. 24). There is a notable change in the physical paper structure observed by the resistance to airflow (Gurley), which doubled with the addition of 1.0% MFC (FIG. 25).

Generally, the addition of MFC tends to increase paper density, which occurs due to the construction of a strong fibrous network, as a result of the high binding capacity of the MFC fibers, thus occurring a steady increase of paper strength properties, as can be observed in the results obtained.

The increased strength verified indicates benefits in the use of paper for converting into packaging, either by increasing the strength of the packaging or by the possibility of reducing the paper grammage. In addition, the considerable increase in the elastic properties discloses the potential use of MFC in the outer layers of the paperboard, which can increase its flexural strength and, subsequently, reduce its grammage.

Application of MFC to Pulp for Producing Sackraft Paper

MFC was applied on sackraft paper for improving tear strength and/or weight reduction. Sackraft paper is a porous kraft paper with greater elasticity and strength.

Increase of Tear Strength of Sackraft Paper by Using MFC in Cellulosic Pulp

Application of MFC compensates the reduction of the degree of refinement, and produces papers with better mechanical properties.

Moreover, the application of MFC allows the reduction of up to 10 $g/m^2$ in sackraft papers. The entire structure of the paper is modified when MFC is applied, and then, it is possible to produce papers with different macro and microporosities, which allows the classification of these papers as new raw material for the application of barriers that already presents MFC as a renewable primer incorporated into its structure.

Thus, modification of paper porosity leaves room for the development of both different and differentiated products, since their structure can be completely modified. Examples of papers of the present invention, which may be also used together with the MFC for obtaining improved mechanical characteristics, but not limited to them, are testliner and corrugated papers.

It is known that the tear index tends to decrease with refining. Thus, lower refining levels tend to further preserve the fiber wall structure. A lower refining intensity demonstrates an improvement in the tear index. On the other hand, little refining does not develop other properties equally important, such as tensile and bursting. In order to maintain these other properties, MFC was applied to pulps with intermediate refinement levels. As an example, the tensile index of the standard pulp (° SR 18) can be achieved with a pulp refined to ° SR 14+4% of MFC.

Figure 26:
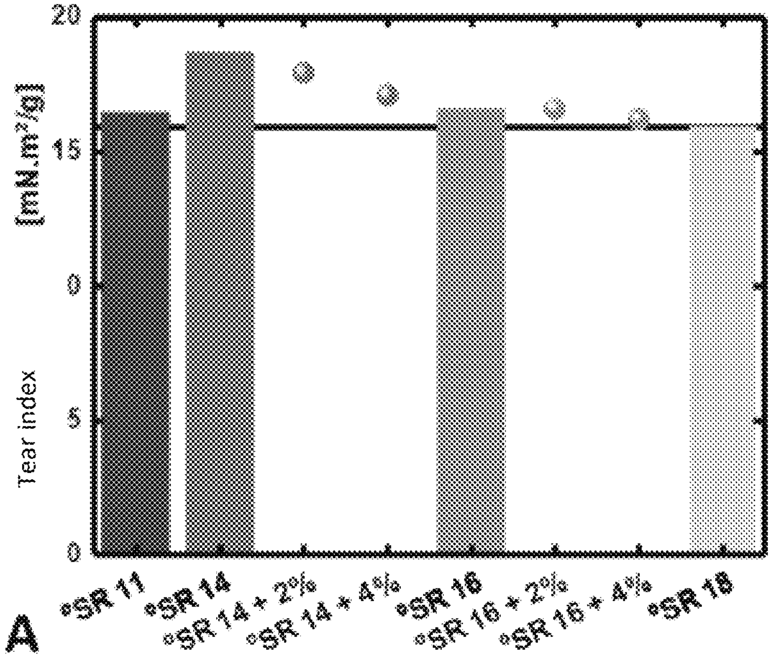
FIG. 26 shows the comparison of the tear index for sackraft papers made with different Schopper Riegler degrees or ° SR and with the addition of MFC at different levels.
Figure 27:
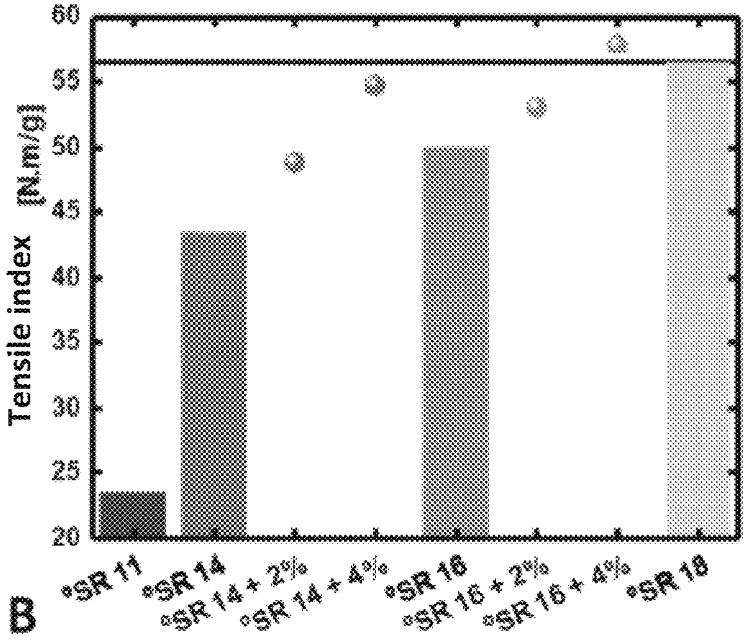
FIG. 27 shows the comparison of the tensile index for sackraft papers made with different Schopper Riegler degrees or ° SR and with the addition of MFC at different levels.
Figure 28:
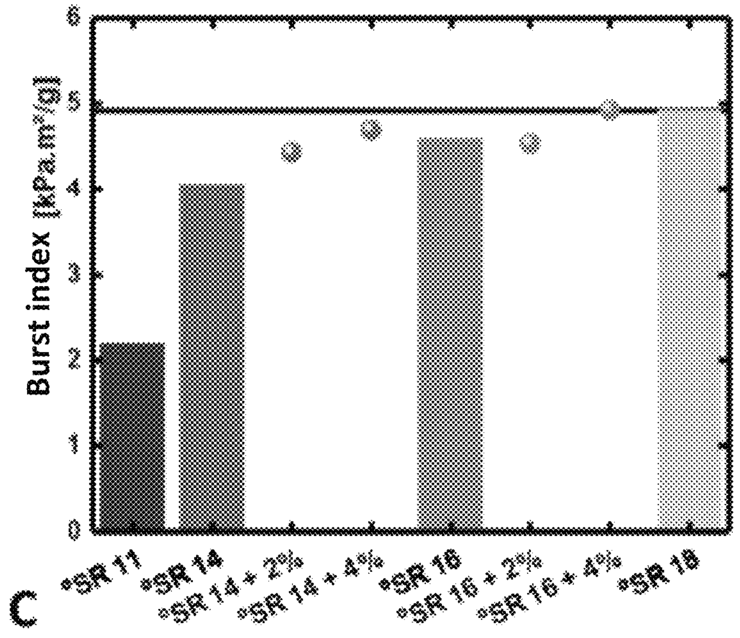
FIG. 28 shows the comparison of the burst index for sackraft papers made with different Schopper Riegler degrees or ° SR and with the addition of MFC at different levels.
Figure 29:
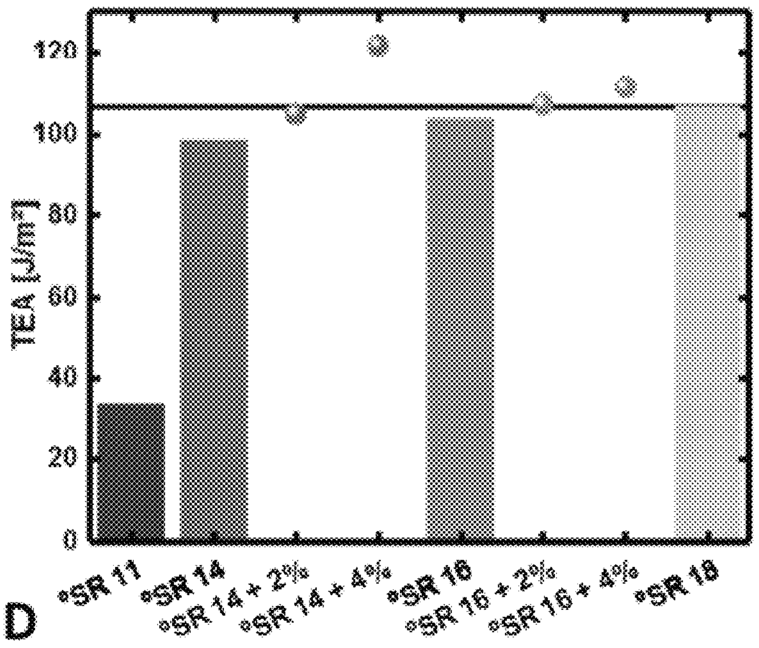
FIG. 29 shows the comparison of Tensile Energy Absorption (TEA) for sackraft papers made with different Schopper Riegler grades or ° SR and with the addition of MFC at different levels.
Figure 30:
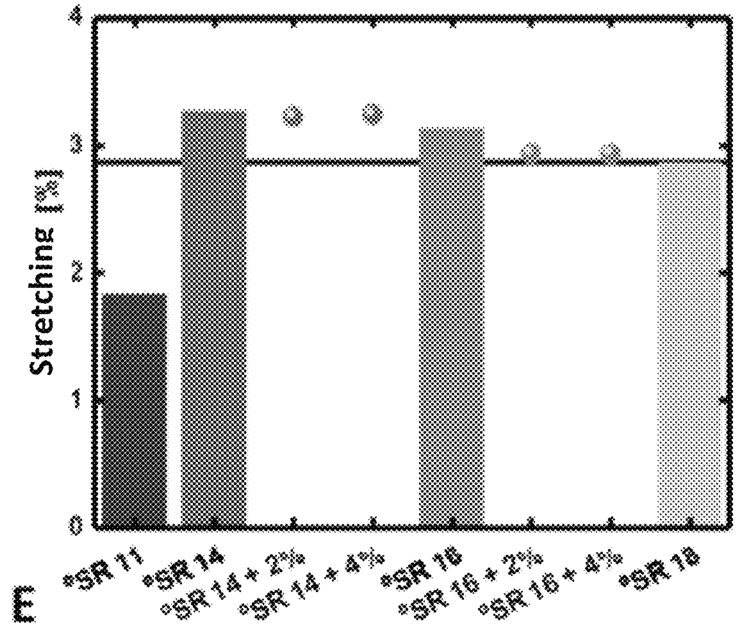
FIG. 30 shows the comparison of stretching for sackraft papers made with different Schopper Riegler degrees or ° SR and with the addition of MFC at different levels.
Figure 31:
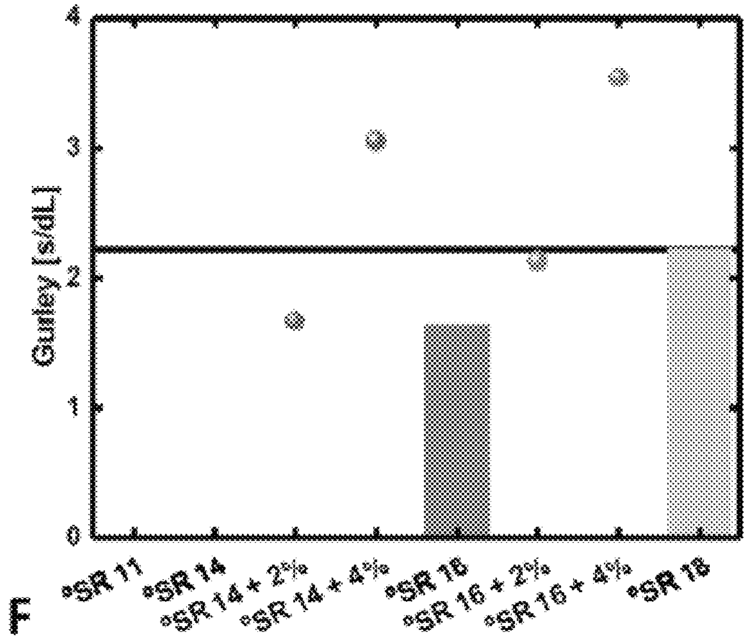
FIG. 31 shows the comparison of resistance to airflow (Gurley) for sackraft papers made with different Schopper Riegler degrees or ° SR and with the addition of MFC at different levels.

Under these conditions, the tear index rose by 8% (FIG. 26), while tensile and burst indexes were maintained (FIGS. 27 and 28). Finally, TEA was raised by about 20% (FIG. 29), the elongation increased by 15% (FIG. 30) and the Gurley was raised by 37% (FIG. 31).

The results showed that, in this case, the application of MFC as internal bonding agent compensates the need for refining, and less refining energy is required.

Figure 32:
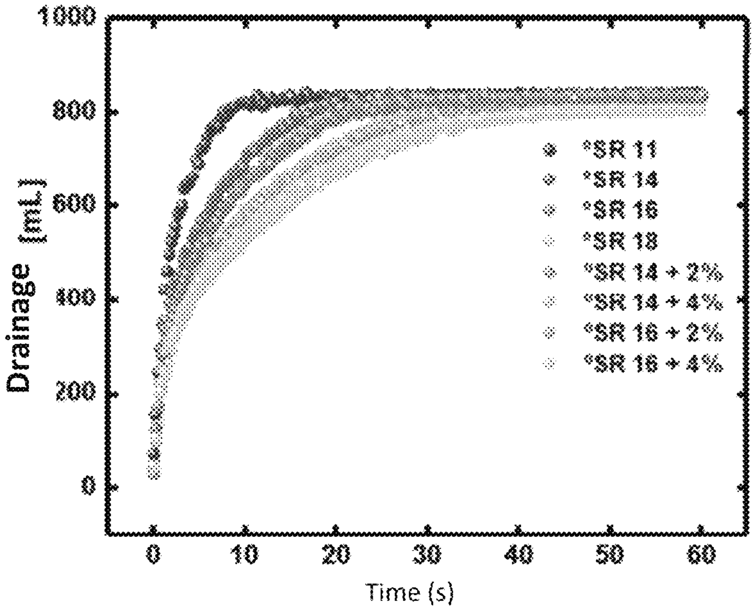
FIG. 32 shows the comparison of drainage for sackraft papers made with different Schopper Riegler degrees or ° SR and with the addition of MFC at different levels.

Additionally, MFC is known as a highly hygroscopic material, which can have effects on the paper drainage process. It can be verified that due to the lower ° SR of the intermediate refinements, the application of MFC did not result in drainage loss (FIG. 32). In fact, in some samples, drainage has proved to be even better than the standard paper, which can bring savings in the paper production process.

Reduction of the Sackraft Paper Grammage by Using MFC in Cellulosic Pulp

Oppositely from the previous scenario, this scenario is aimed at reducing grammage as the focus for approving the use of MFC. Thus, two levels of MFC (2 and 5%) were tested, and the grammages were reduced in steps of 5 $g/m^2$.

It is to be noted that the differentiating factor of this invention is the use of MFC and the consequences derived from this use. At first, the paper grammage is fixed and different concentrations of MFC are added, aiming at changes of grammage, among other factors. The search in grammage reduction is derived from the study of different concentrations of MFC to cellulose pulp.

Figure 33:
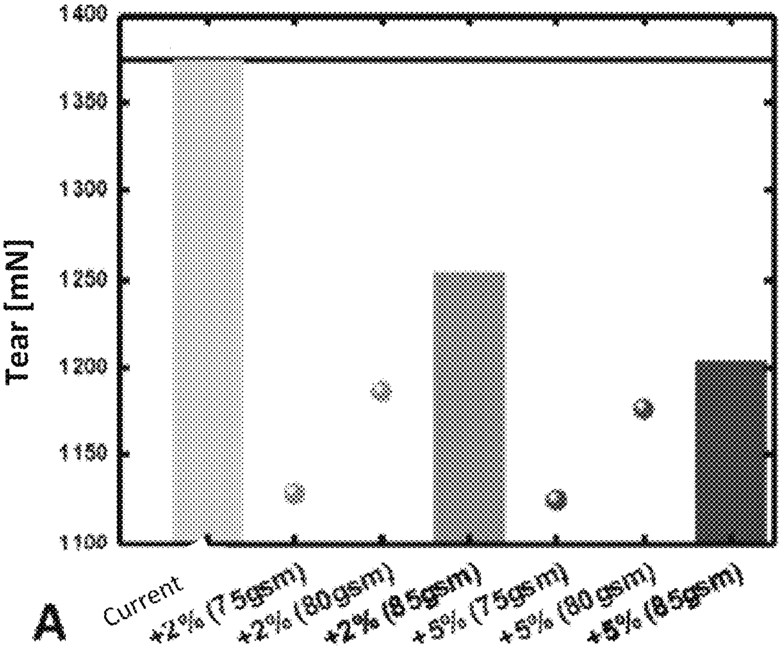
FIG. 33 shows the comparison of tear for sackraft papers made with different grammages and with the addition of MFC at different levels.
Figure 34:
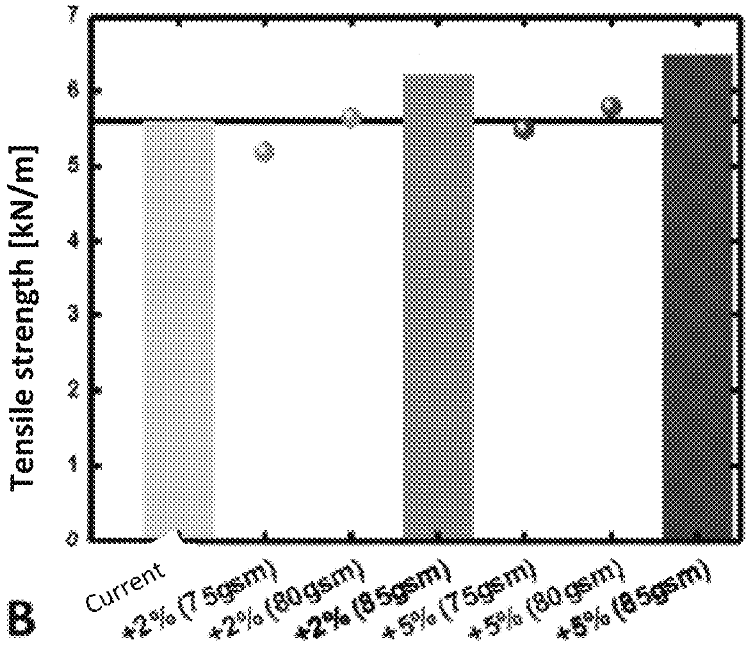
FIG. 34 shows the comparison of tensile strength for sackraft papers made with different grammages and with the addition of MFC at different levels.
Figure 35:
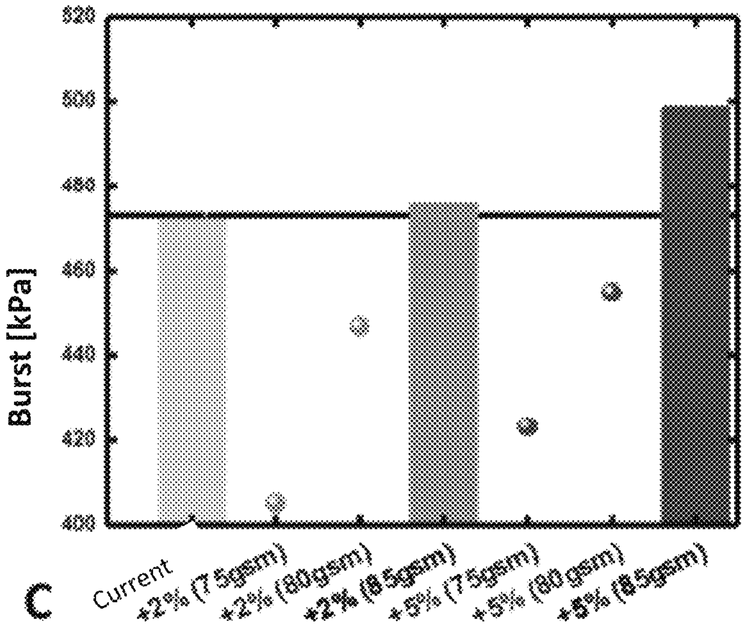
FIG. 35 shows the comparison of bursting for sackraft papers made with different grammages and with the addition of MFC at different levels.
Figure 36:
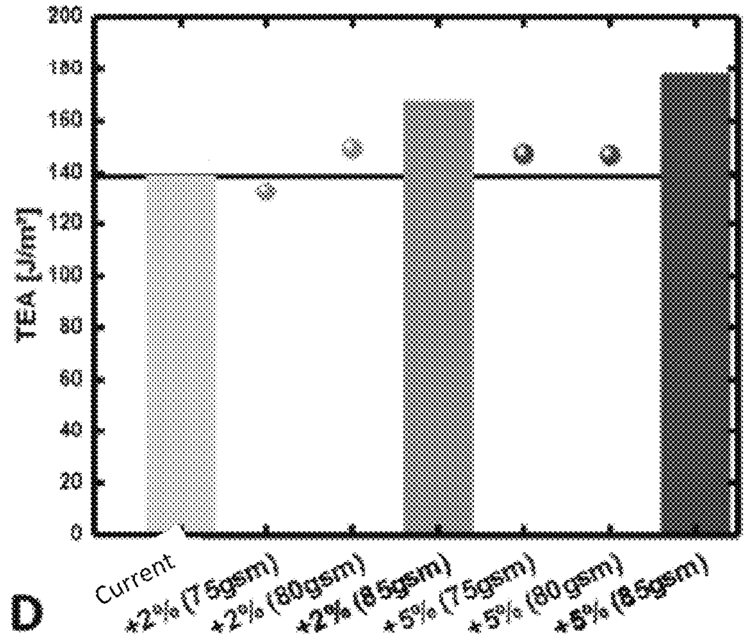
FIG. 36 shows the comparison of Tensile Energy Absorption (TEA) for sackraft papers made with different grammages and with the addition of MFC at different levels.
Figure 37:
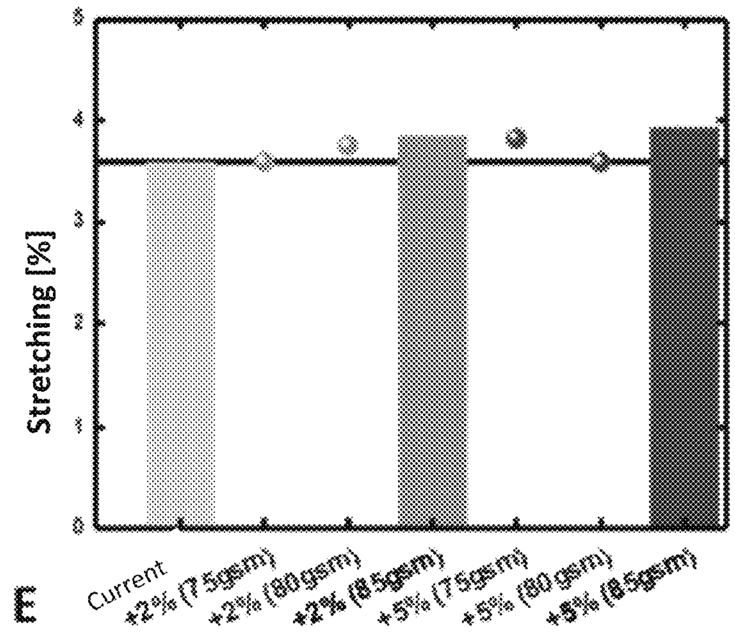
FIG. 37 shows the comparison of stretching for sackraft papers made with different grammages and with the addition of MFC at different levels.
Figure 38:
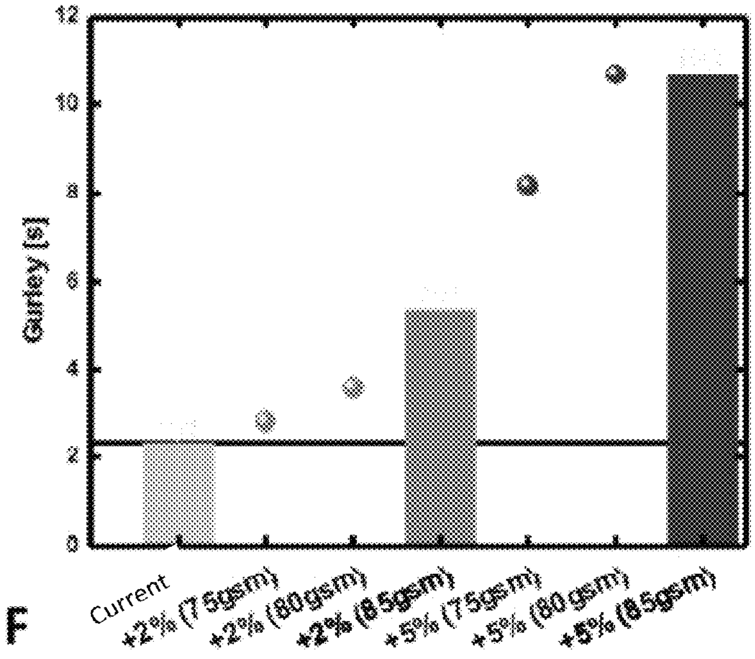
FIG. 38 shows the comparison of resistance to airflow (Gurley) for sackraft papers made with different grammages and with the addition of MFC at different levels.

As expected, the use of MFC in the same matrix pulp tends to negatively influence the tear properties due to the greater paper thickening (FIG. 33). On the other hand, MFC, considering only the current grammage of 85 $g/m^2$, raises tensile (FIG. 34), bursting (FIG. 35), TEA (FIG. 36) and stretching 37) properties. It is interesting to note that the application of MFC compensates grammage in all mechanical properties. As an example, the reduction of 10 $g/m^2$ (85 to 75 $g/m^2$), by applying 2% of MFC demonstrates that the specifications of the current product are maintained. Thus, both the wood production chain and the industrial transformation benefit from the less use of raw materials. Finally, the Gurley property had an increase of about 400% (FIG. 38), which justifies the use of MFC as a renewable primer on sackraft paper.

Application of MFC to Pulp for Producing Paperboard

The use of MFC in cellulosic pulp for in the manufacture of paperboard can occur in different layers of that paper, since having a cover layer and a base layer is an intrinsic feature of the paperboard, which are bonded by a middle layer. Each of these layers may be manufactured with several inner layers with smaller grammage, but the intent of the MFC evaluation in the present invention relates only to the 3 major layers.

Use of MFC to Manufacture the Paperboard Cover Layer

Figure 39:
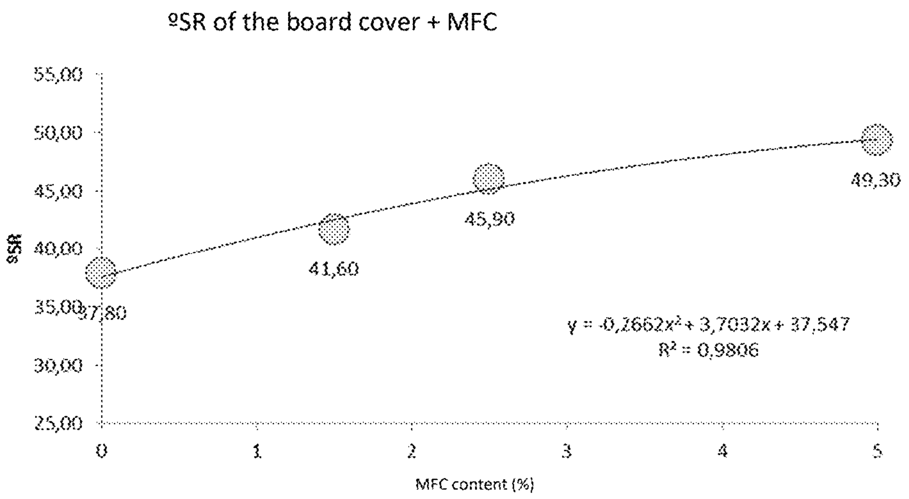
FIG. 39 shows the comparison of addition of MFC at different levels with the Schopper Riegler degree or ° SR of the cover layer of the paperboard manufactured.
Figure 40:
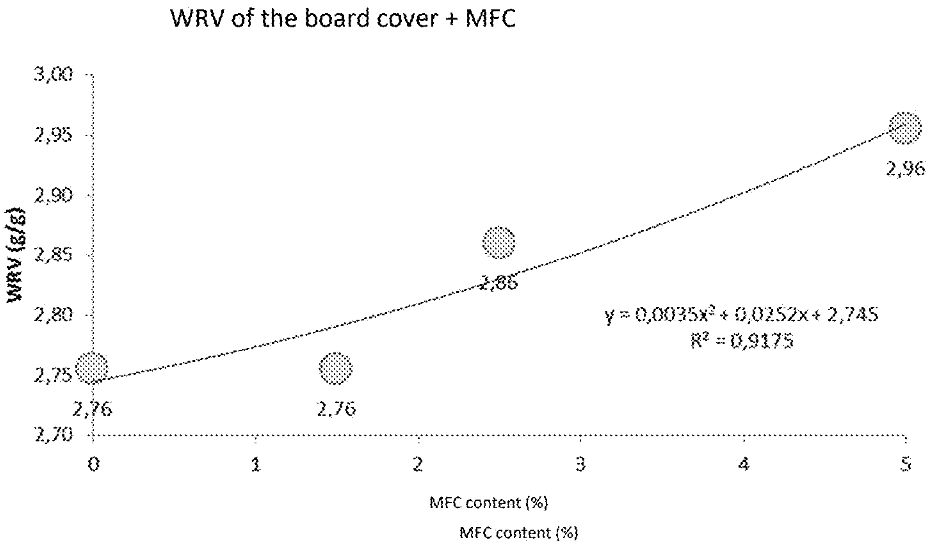
FIG. 40 shows the comparison of the Water Retention Value (WRV) or water retention value of the paperboard cover layer made with different concentrations of MFC added to the cellulosic pulp of that paperboard layer.
Figure 41:
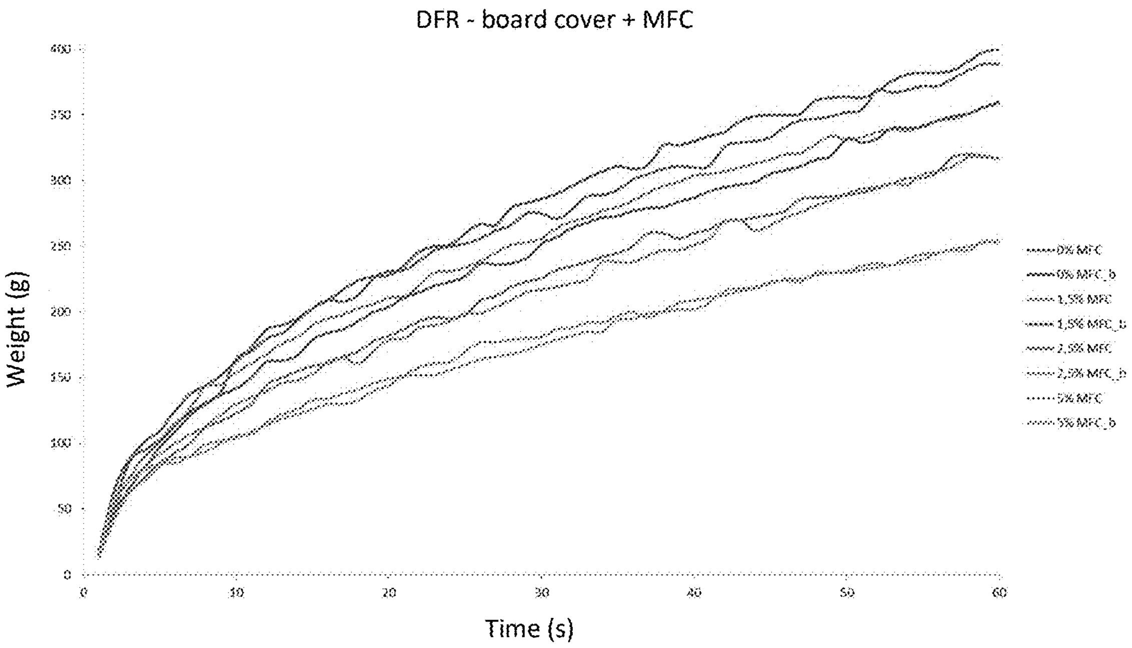
FIG. 41 shows the comparison of drainage (Drainage Freeness Retention or DFR) of the paperboard cover layer made with different concentrations of MFC added to the cellulosic pulp of that paperboard layer.

This section shows the behavior of the addition of MFC in the cellulosic pulp of the paperboard cover layer. It is possible to notice the increase of ° SR and of the water retention value (WRV) with the increase of the MFC content used in the pulp (FIGS. 39 and 40). The increase in ° SR indicates a greater difficulty in the water physical drainage, while the WRV increase indicates a higher interaction of water with the cellulosic fibers (high specific surface area), which is evidenced by the change in the drainage behavior (DFR) (FIG. 41).

Figure 42:
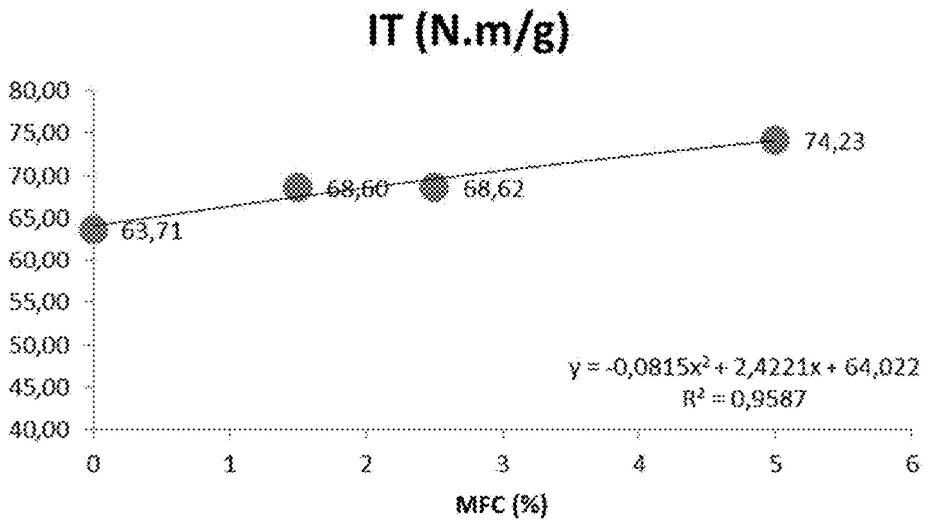
FIG. 42 shows the comparison of the tensile index (IT) of the paperboard cover layer made with different concentrations of MFC added to the cellulosic pulp of that paperboard layer.
Figure 43:
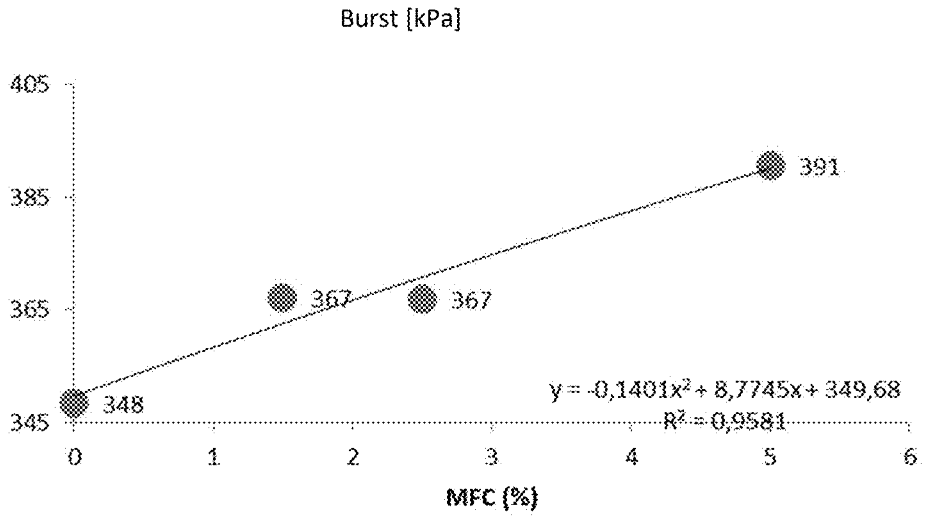
FIG. 43 shows the comparison of the burst index of the paperboard cover layer made with different concentrations of MFC added to the cellulosic pulp of that paperboard layer.
Figure 44:
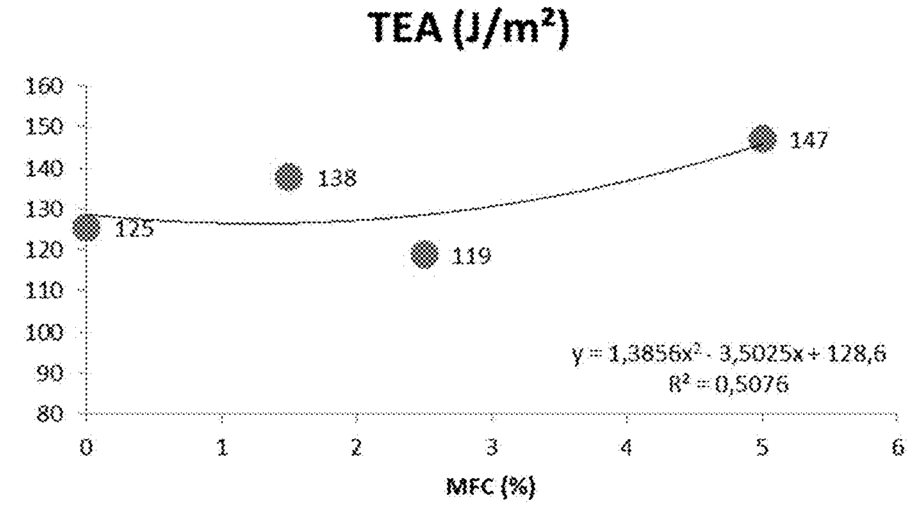
FIG. 44 shows the comparison of the Tensile Energy Absorption (TEA) of the paperboard cover layer made with different concentrations of MFC added to the cellulosic pulp of that paperboard layer.
Figure 45:
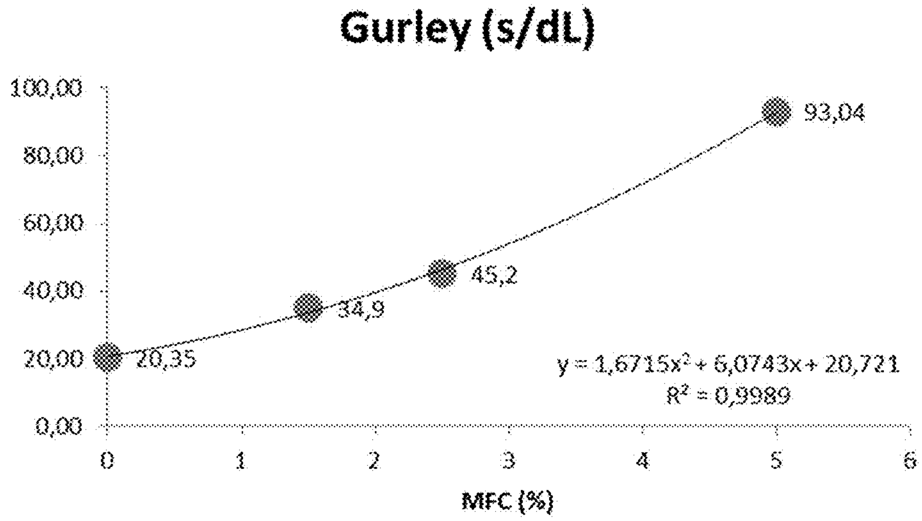
FIG. 45 shows the comparison of the resistance to airflow (Gurley) of the paperboard cover layer made with different concentrations of MFC added to the cellulosic pulp of that paperboard layer.
Figure 46:
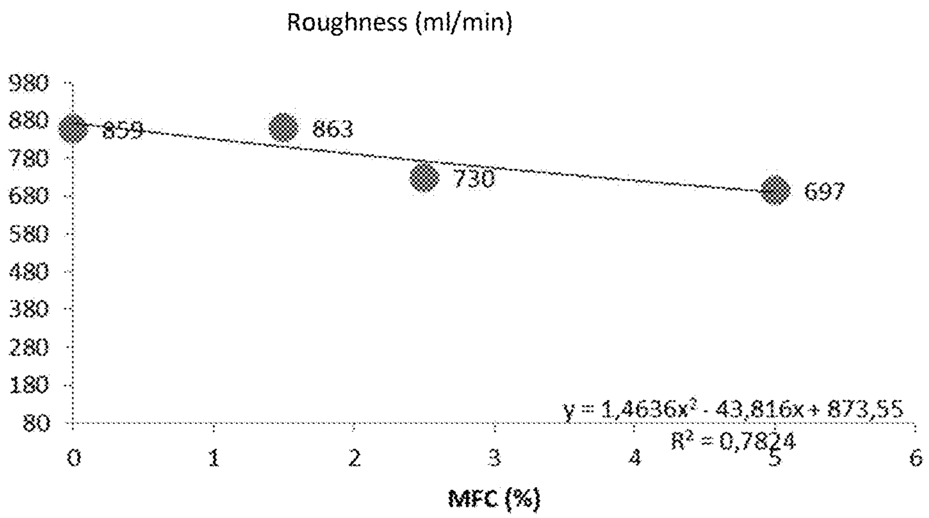
FIG. 46 shows the comparison of roughness of the paperboard cover layer made with different concentrations of MFC added to the cellulosic pulp of that paperboard layer.

The physical and mechanical strength of the paperboard cover layer produced with the addition of MFC to the pulp were also studied. Properties such as the tensile index (IT), bursting and TEA show a growing trend to increase, which demonstrates the production of a more resistant cover layer (FIGS. 42, 43 and 44). The reduction of roughness (FIG. 46) can be explained by the modification of the macro and micro porosities of the paper, indicated by the increase in resistance to airflow (Gurley) (FIG. 45).

Use of MFC to Manufacture the Paperboard Middle Layer

Figure 47:
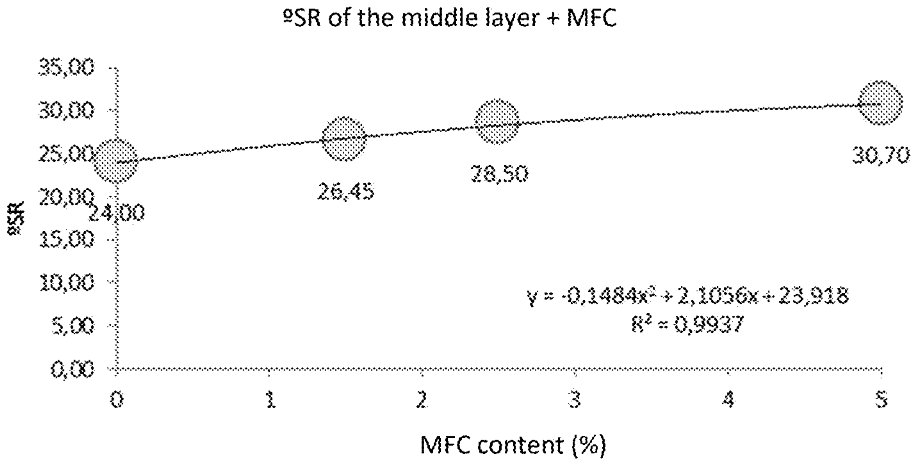
FIG. 47 shows the comparison of drain resistance (indicated by Schopper Riegler degree or ° SR) of the middle layer of the paperboard made with different concentrations of MFC added to the cellulosic pulp of that paperboard layer.
Figure 48:
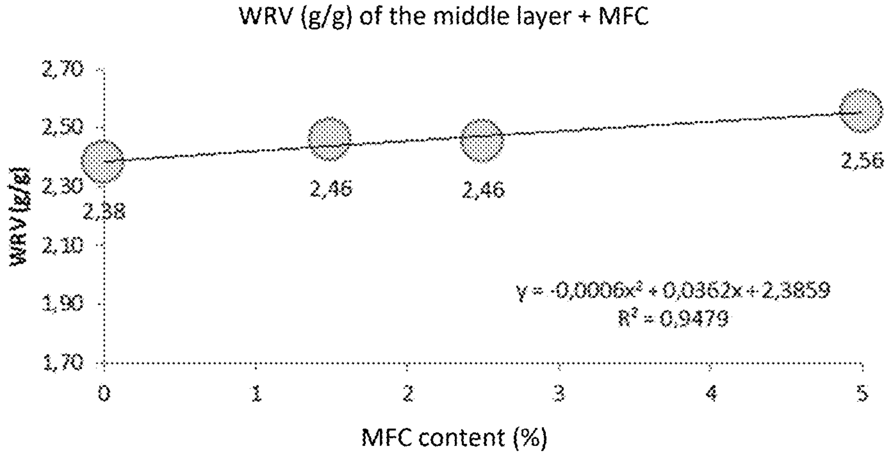
FIG. 48 shows the comparison of the Water Retention Value (WRV) or water retention value of the middle layer of the paperboard made with different concentrations of MFC added to the cellulosic pulp of that paperboard layer.
Figure 49:
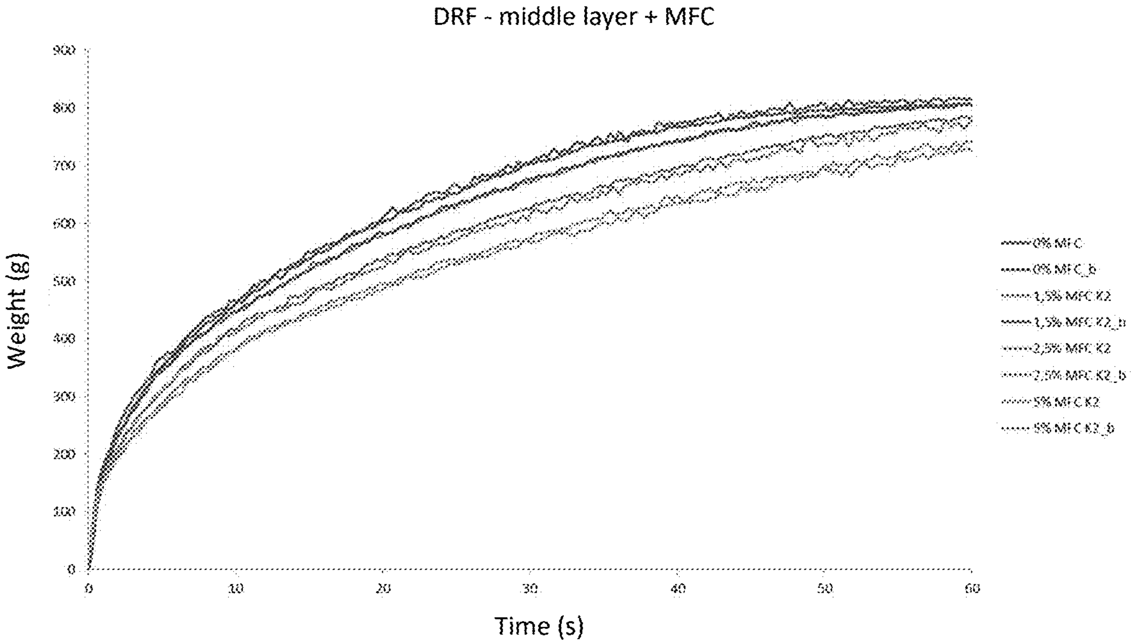
FIG. 49 shows the comparison of drainage (Drainage Freeness Retention or DFR) of the middle layer of the paperboard made with different concentrations of MFC added to the cellulosic pulp of that paperboard layer.
Figure 50:
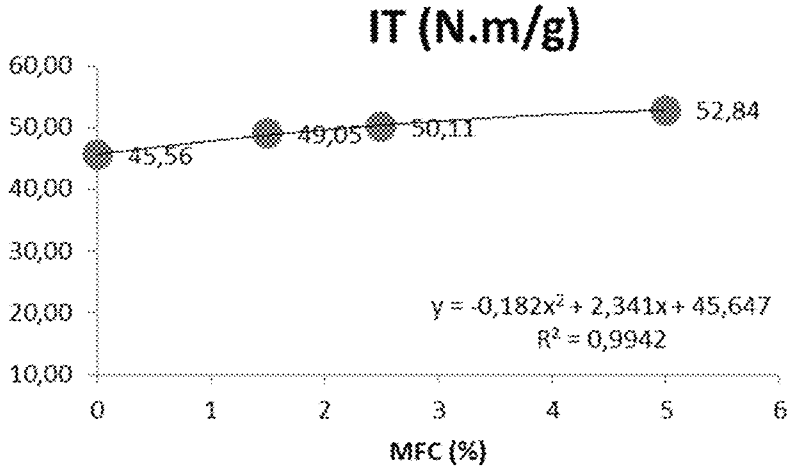
FIG. 50 shows the comparison of the tensile index (IT) of the paperboard middle layer made with different concentrations of MFC added to the cellulosic pulp of that paperboard layer.
Figure 51:
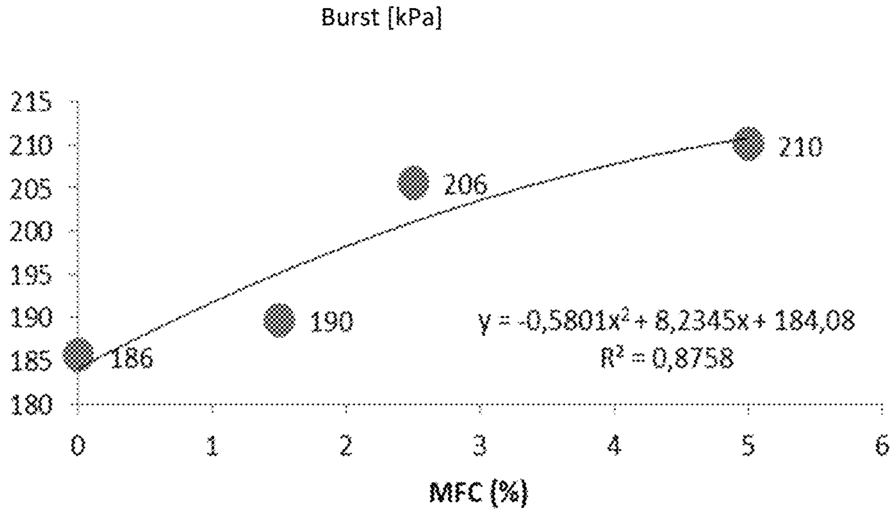
FIG. 51 shows the comparison of bursting of the paperboard middle layer made with different concentrations of MFC added to the cellulosic pulp of that paperboard layer.
Figure 52:
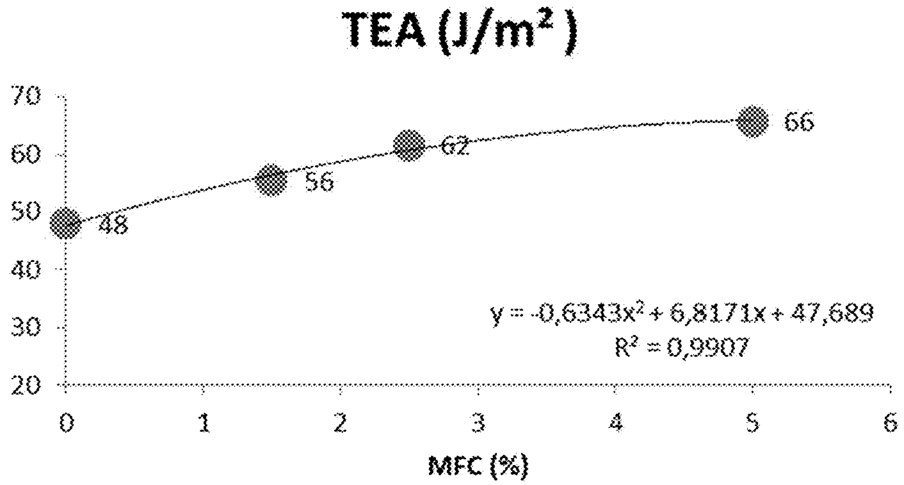
FIG. 52 shows the comparison of the Tensile Energy Absorption (TEA) of the paperboard middle layer made with different concentrations of MFC added to the cellulosic pulp of that paperboard layer.
Figure 53:
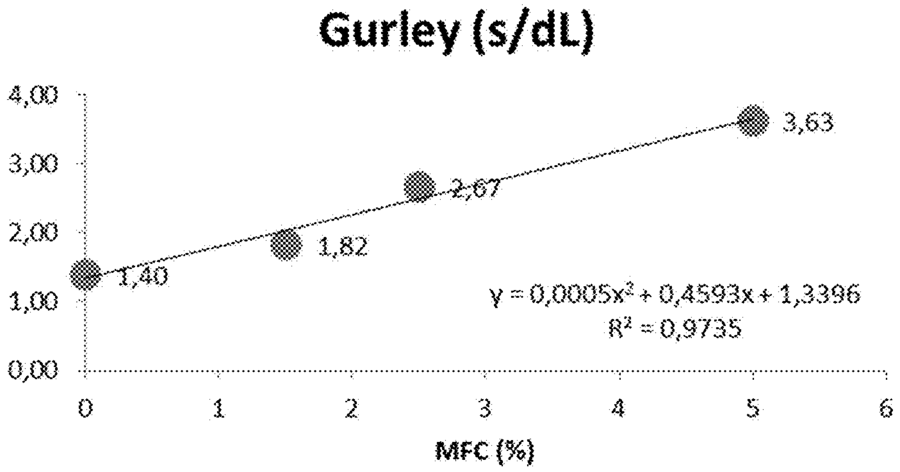
FIG. 53 shows the comparison of the resistance to airflow (Gurley) of the paperboard middle layer made with different concentrations of MFC added to the cellulosic pulp of that paperboard layer.

Just like the cover layer study, the increase of ° SR in the middle layer (FIG. 47) indicates greater difficulty in the water physical drainage, while the increase in WRV (FIG. 48) shows that the addition of MFC also promotes, due to its greater specific surface, a higher frequency of interactions with water, which is also indicated by the modified drainage behavior (FIG. 49). However, it is possible to observe that, due to the composition of the paperboard middle layer, there is a smaller increment of properties related to drainage and physical-chemical interaction with water, when compared to the cover layer, which demonstrates that the fibrous composition influences the bonding mechanisms and formation of the fibrous network at the fiber-MFC-fiber interface.

The paperboard middle layer is generally the bonding layer between the surface and the base of the paperboard. By adding MFC to its fibrous composition, an increase in the physical and mechanical strength properties (FIGS. 50, 51, 52 and 53) was observed in tests with the cover layer.

Use of MFC to Manufacture the Paperboard Base Layer

Figure 54:
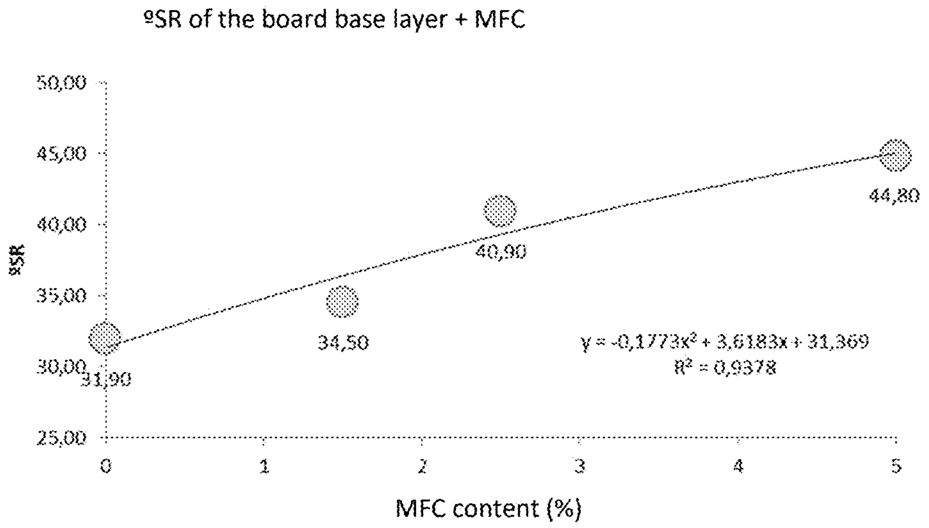
FIG. 54 shows the comparison of the Schopper Riegler degree or ° SR of the paperboard base layer made with different concentrations of MFC added to the cellulosic pulp of that paperboard layer.
Figure 55:
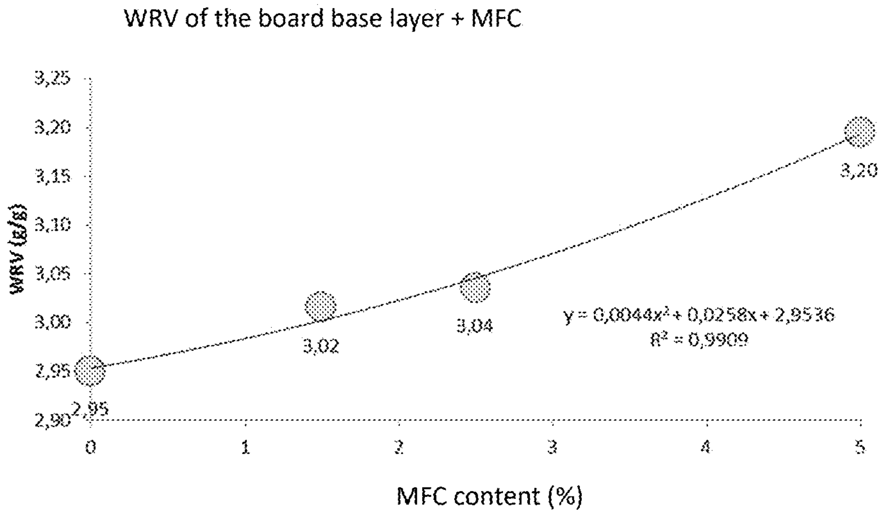
FIG. 55 shows the comparison of the Water Retention Value (WRV) or water retention value of the paperboard base layer made with different concentrations of MFC added to the cellulosic pulp of that paperboard layer.
Figure 56:
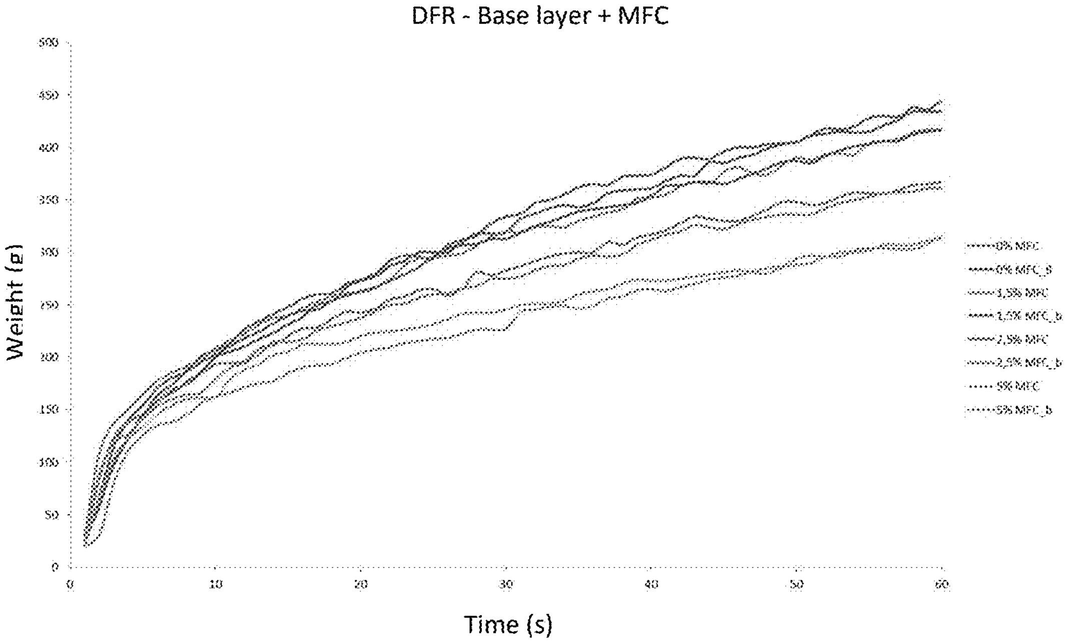
FIG. 56 shows the comparison of drainage (Drainage Freeness Retention or DFR) of the base layer of the paperboard made with different concentrations of MFC added to the cellulosic pulp of that paperboard layer.

The board base layer shows the same effects previously observed with the cover and middle layers. As MFC is added to cellulosic pulp, the increase of ° SR occurs, indicating greater difficulty in the physical drainage of water, which is also indicated by the altered drainage behavior (FIGS. 54, 55 and 56).

Figure 57:
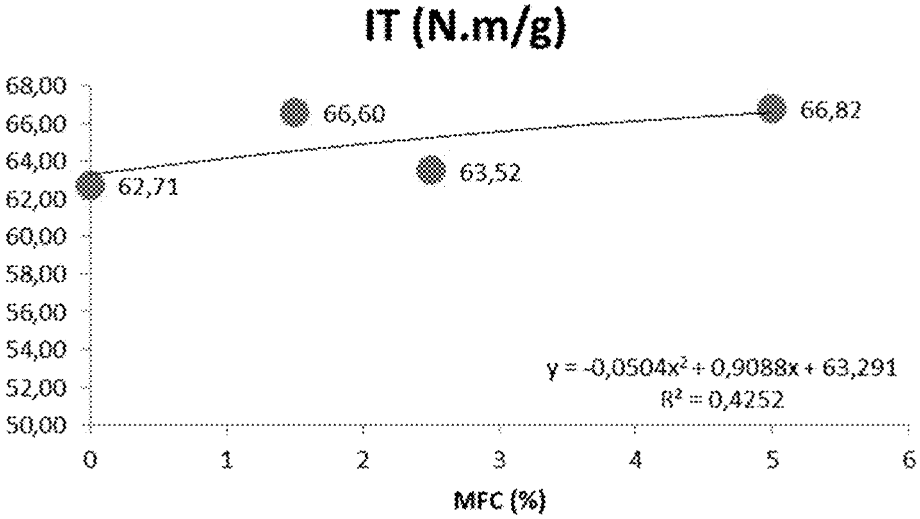
FIG. 57 shows the comparison of the tensile index (IT) of the paperboard base layer made with different concentrations of MFC added to the cellulosic pulp of that paperboard layer.
Figure 58:
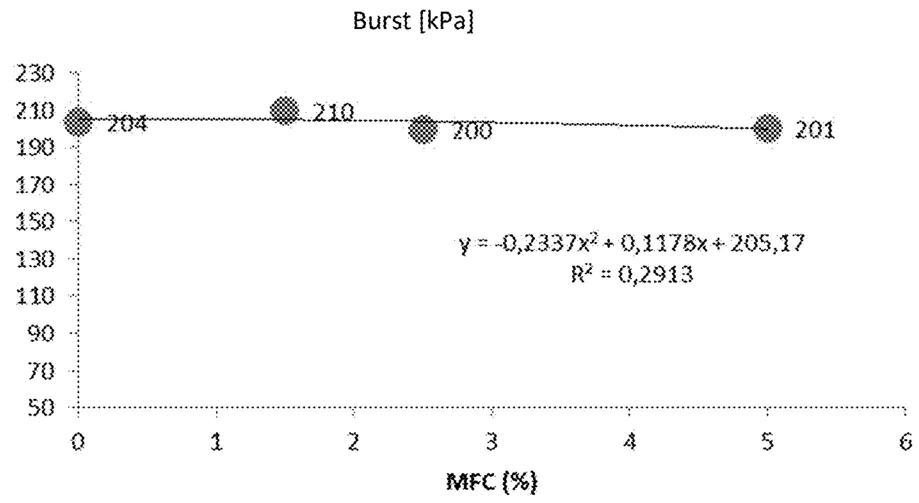
FIG. 58 shows the comparison of bursting of the paperboard base layer made with different concentrations of MFC added to the cellulosic pulp of that paperboard layer.
Figure 59:
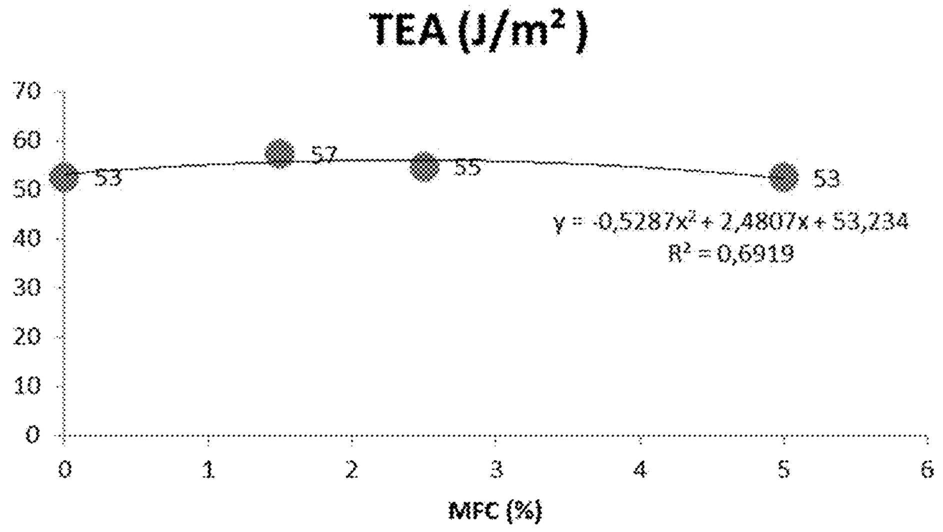
FIG. 59 shows the comparison of the Tensile Energy Absorption (TEA) of the paperboard base layer made with different concentrations of MFC added to the cellulosic pulp of that paperboard layer.
Figure 60:
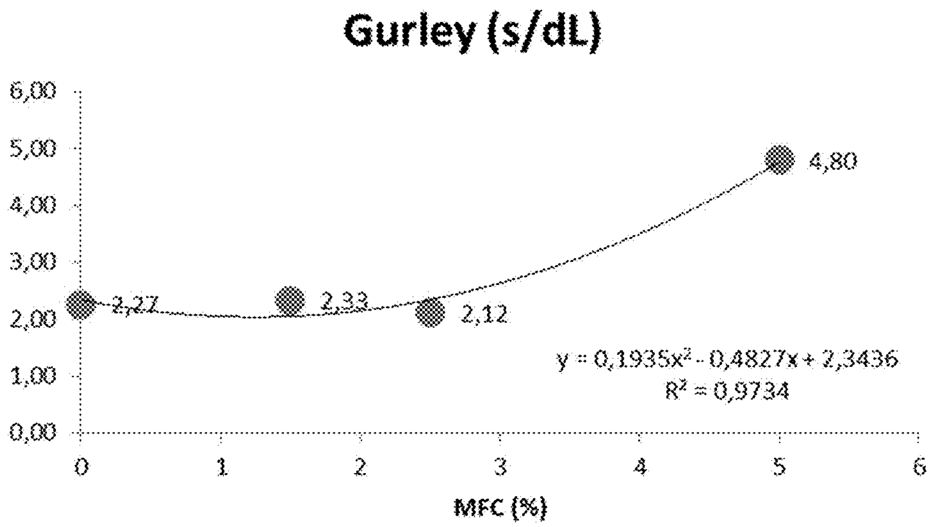
FIG. 60 shows the comparison of the resistance to airflow (Gurley) of the paperboard base layer made with different concentrations of MFC added to the cellulosic pulp of that paperboard layer.

However, regarding the physical and mechanical strength properties, only the tensile (IT) and Gurley indexes increased (FIGS. 57 and 60), unlike the cover and medium layers. The burst index and TEA properties remained close to the initial values (FIGS. 58 and 59), indicating lower anchorage of the MFC to the pulp cellulosic fiber.

Application of MFC to Cellulosic Pulp Available in the Market

This application corresponds to the addition of MFC to the cellulosic pulp commercially available, a viable alternative for paper producers who already have a stock of cellulosic pulp and plan to produce paper with improved characteristics.

Figure 61:
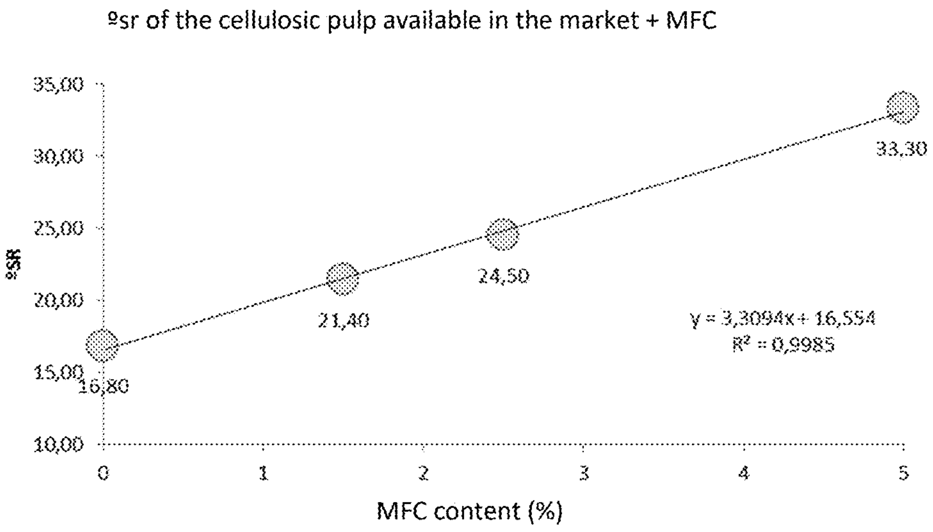
FIG. 61 shows the comparison of the Schopper Riegler degree or ° SR of the cellulosic pulp available in the market with different concentrations of MFC.
Figure 62:
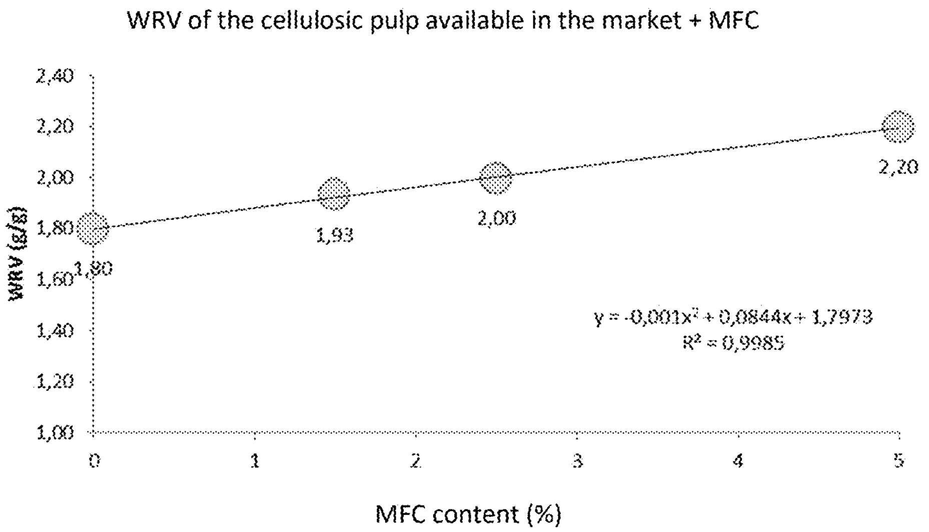
FIG. 62 shows the comparison of the Water Retention Value (WRV) or water retention value of the cellulosic pulp available in the market with different concentrations of MFC.
Figure 63:
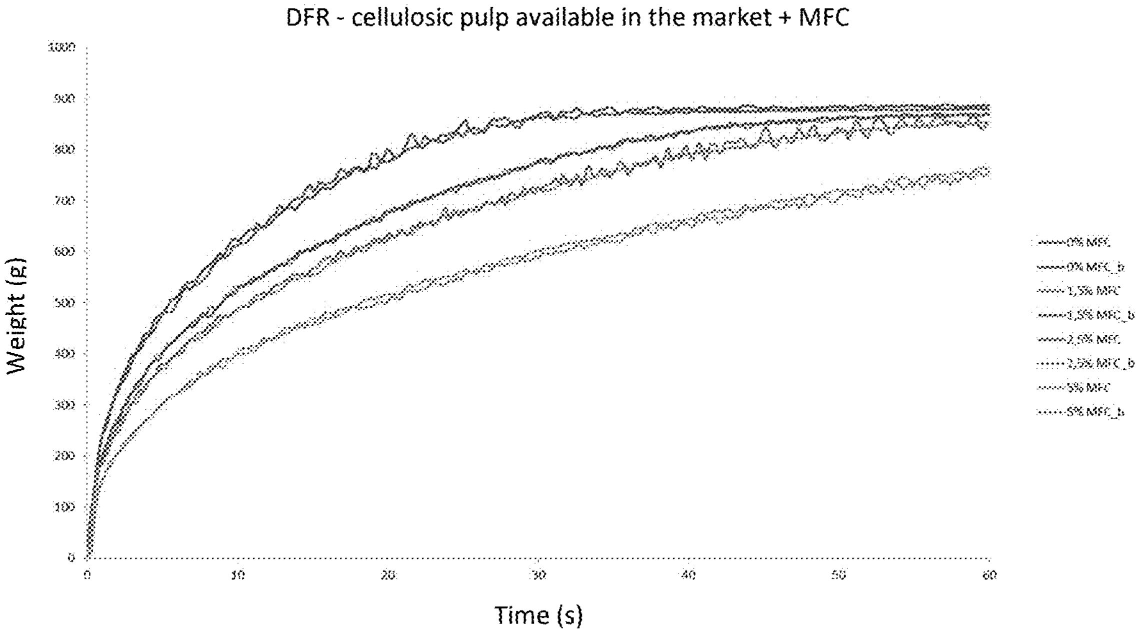
FIG. 63 shows the comparison of drainage (Drainage Freeness Retention or DFR) of the cellulosic pulp available in the market with different concentrations of MFC.
Figure 64:
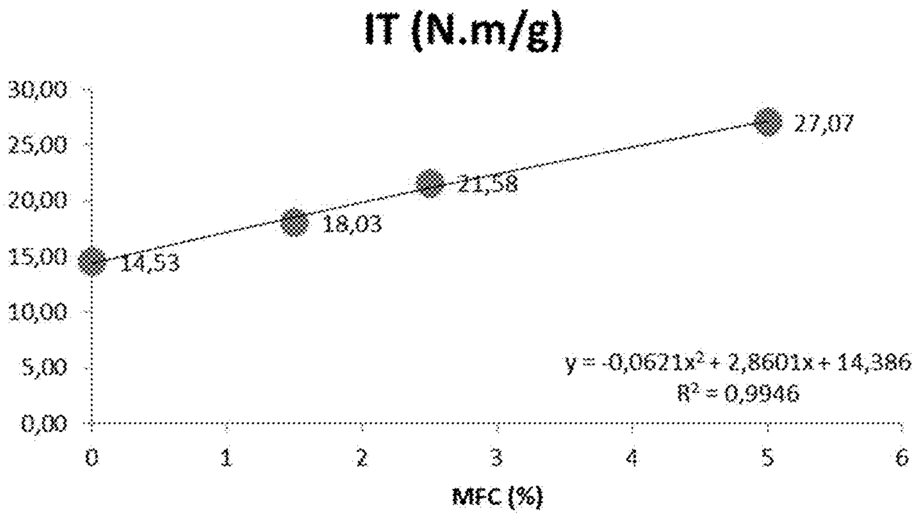
FIG. 64 shows the comparison of the tensile index (IT) of the cellulosic pulp available in the market with different concentrations of MFC.

Thus, the tests carried out so far were made directly on the cellulosic pulp. It is possible to observe the increase of the ° SR value with the addition of MFC (FIG. 61) due to the modification of the drainage structure of the blanket formed by the fibers+MFC composition. The same behavior occurs with the WRV property (FIG. 62), which demonstrates a slight increase of the values according to the graph and indicates that the increase of the MFC content in the cellulosic pulp may potentiate the physical-chemical interactions with the water present in the medium, a phenomena which can be also observed in the drainage curves obtained (FIG. 63).

Figure 65:
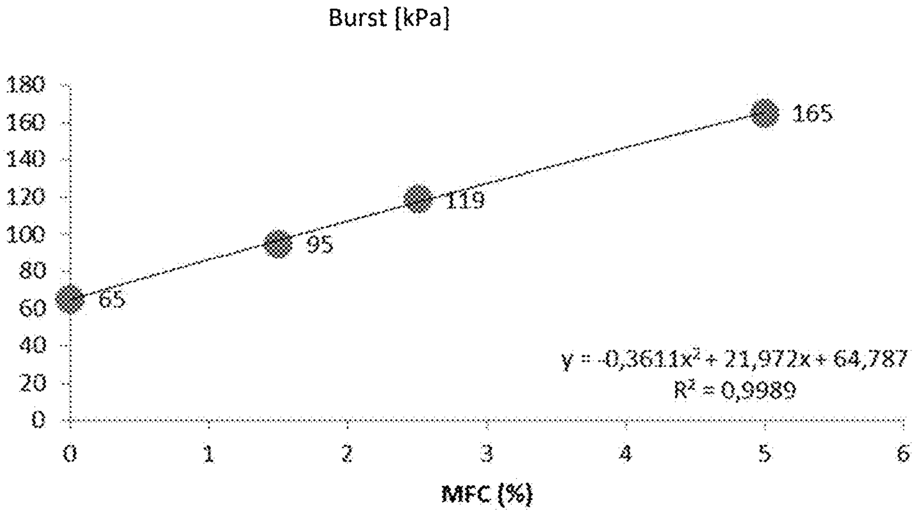
FIG. 65 shows the comparison of bursting of the cellulosic pulp available in the market with different concentrations of MFC.
Figure 66:
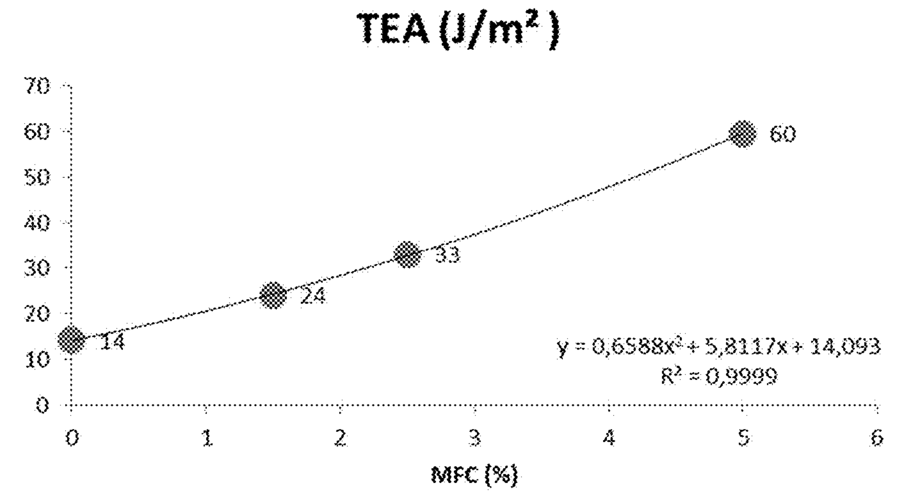
FIG. 66 shows the comparison of the Tensile Energy Absorption (TEA) of the cellulosic pulp available in the market with different concentrations of MFC.
Figure 67:
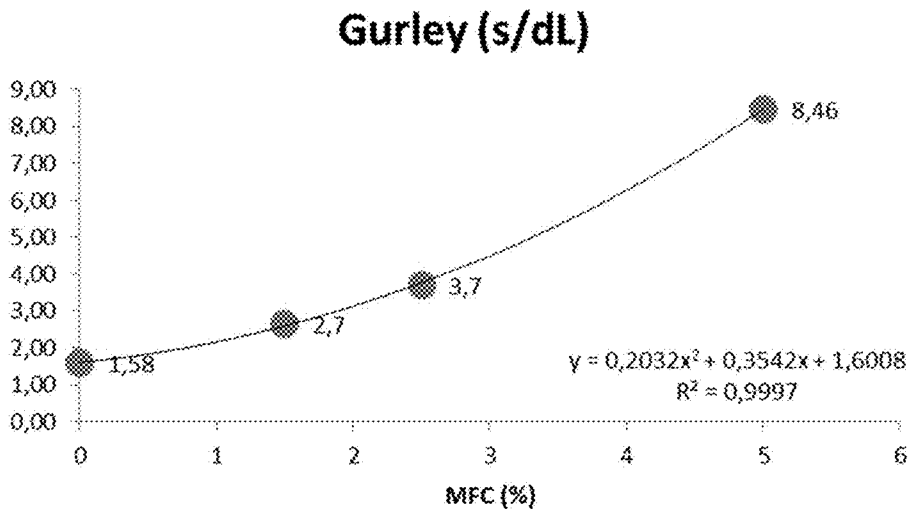
FIG. 67 shows the comparison of resistance to airflow (Gurley) of the cellulosic pulp available in the market with different concentrations of MFC.
Figure 68:
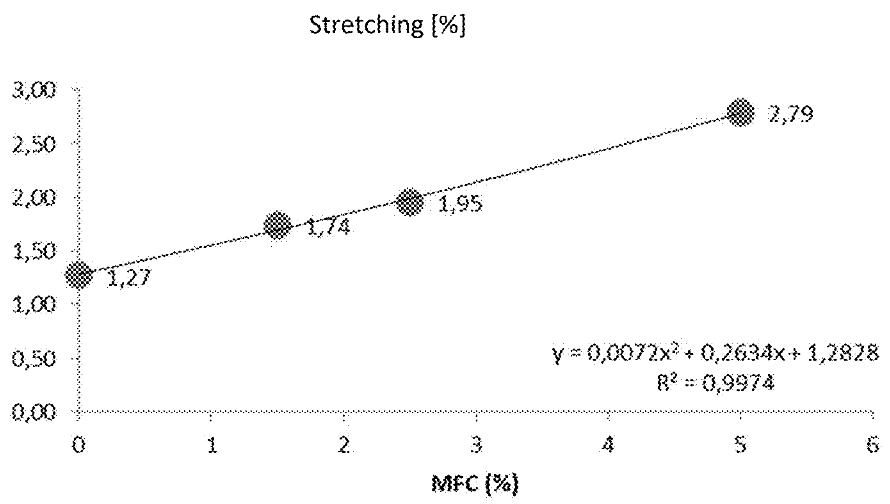
FIG. 68 shows the comparison of stretching of the cellulosic pulp available in the market with different concentrations of MFC.
Figure 69:
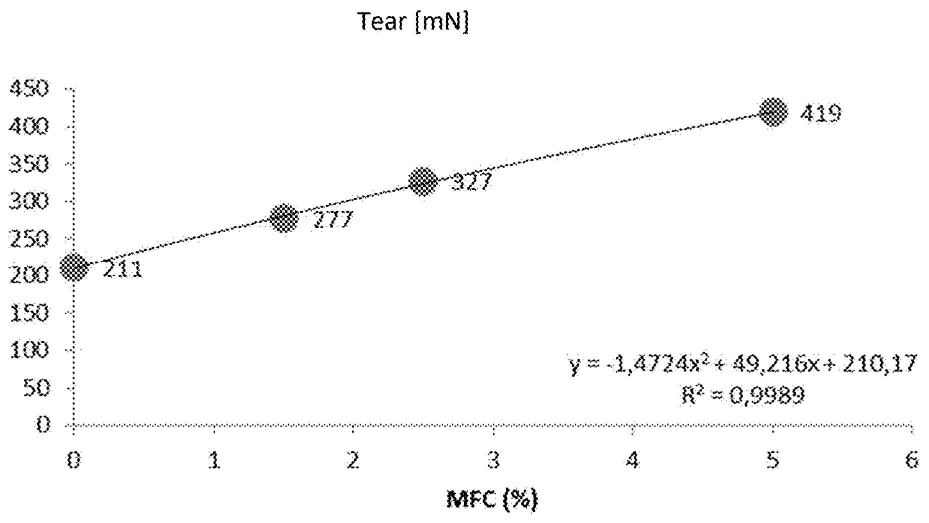
FIG. 69 shows the comparison of tear of the cellulosic pulp available in the market with different concentrations of MFC.
Figure 70:
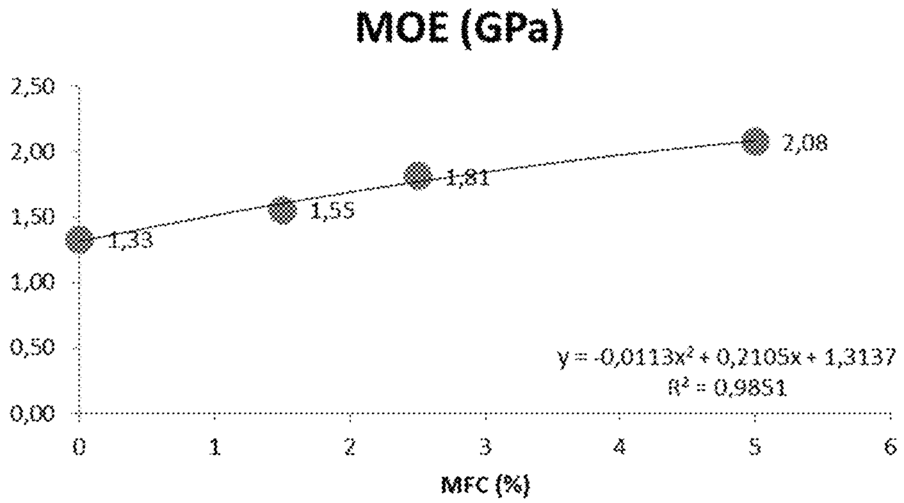
FIG. 70 shows the comparison of the Modulus of Elasticity (MOE) of the cellulosic pulp available in the market with different concentrations of MFC.

The strength properties of the cellulosic pulp with the addition of MFC were also evaluated. It is worth noting that when MFC was added in the bleached short fiber cellulosic pulp, it was possible to observe gains in mechanical strength higher than 50%, as in the burst index (FIG. 65) and TEA (FIG. 66)), while other mechanical strength tests, such as stretching (FIG. 68), tear index (FIG. 69) and Modulus of Elasticity (MOE) (FIG. 70) showed growth very close to 50%. However, Gurley (FIG. 67), also increased, as expected.

The impact on adding a biopolymer, such as MFC, in the composition of the cellulose pulp available in the market could positively influence the properties of the final product on the customer end. Thus, when using the market cellulose pulp containing CFM, it will be possible to reduce the energy input needed to refine the pulp, and to produce a final product with unique mechanical strength properties.

The invention claimed is:

1. A paper comprising microfibrillated cellulose in an amount of 1.0 to 1.5% in weight of a cellulose pulp and starch in an amount of 1.0 to 10.0 kg/ton of the cellulose pulp, wherein the paper has grammage from 60 to 440 g/m$^2$, and wherein the microfibrillated cellulose is used as a strength additive and has diameter from 99 to 568 nanometers, wherein the paper is made by mixing the cellulose pulp with said microfibrillated cellulose and said starch in a mixing tank, the paper being a kraftliner, testliner, sack kraft, corrugated paper, or paperboard.

2. A process for making a paper, comprising:

mixing microfibrillated cellulose (MFC) in an amount of 1.0 to 1.5% in weight of a cellulose pulp and starch in an amount of 1.0 to 10.0 kg/ton of the cellulose pulp with the cellulose pulp in a mixing tank to provide a pulp mixture, and forming the paper from the pulp mixture, wherein the paper has grammage from 60 to 440 g/m$^2$ and diameter of the microfibrillated cellulose is from 99 to 568 nanometers.

3. The process according to claim 2, wherein the cellulose pulp is unbleached, bleached or mechanical, and that the MFC is derived from the same fiber mixture of said paper.

4. The process according to claim 3, wherein the MFC is produced from short unbleached pulp, wherein the paper is a kraft paper comprising paper grammage from 60 to 440 g/m$^2$, and wherein diameter of the microfibrillated cellulose is from 99 to 568 nanometers.

5. The process according to claim 3, wherein the MFC is produced from long unbleached pulp, and the paper is a sack kraft paper.

6. The process according to claim 3, wherein the MFC is long brown MFC, the cellulose pulp and the paper is unbleached, and the paper is a corrugated paper.

7. The process according to claim 3, wherein the MFC is short bleached MFC, the cellulose pulp and the paper is bleached, and the paper is a cover layer for a paperboard.

8. The process according to claim 3, wherein the MFC is short non-bleached MFC, the cellulose pulp is a mechanical and kraft cellulose pulp and the paper is base and intermediate layers of a paperboard.

9. The paper according to claim 1, wherein the microfibrillated cellulose has diameter from 100 to 568 nanometers.

10. The process according to claim 3, wherein the microfibrillated cellulose has diameter from 100 to 568 nanometers.

* * * * *